(12) United States Patent
Hudson

(10) Patent No.: US 8,105,089 B2
(45) Date of Patent: Jan. 31, 2012

(54) MEDICAL PROCEDURES TRAINING MODEL

(76) Inventor: Darrin Allan Hudson, Spruce Grove (CA)

(*) Notice: Subject to any disclaimer, the term of this patent is extended or adjusted under 35 U.S.C. 154(b) by 109 days.

(21) Appl. No.: 12/781,309

(22) Filed: May 17, 2010

(65) Prior Publication Data

US 2011/0165547 A1 Jul. 7, 2011

(51) Int. Cl.
G09B 23/28 (2006.01)

(52) U.S. Cl. ...................................... 434/274

(58) Field of Classification Search .................. 434/262, 434/264, 267, 270, 274, 295–297; 623/17, 623/19
See application file for complete search history.

(56) References Cited

U.S. PATENT DOCUMENTS

| | | | |
|---|---|---|---|
| 2,689,415 A | 9/1954 | Haver | |
| 3,009,265 A * | 11/1961 | Bezark | 434/270 |
| 3,789,518 A | 2/1974 | Chase | |
| 3,802,096 A * | 4/1974 | Matern | 434/270 |
| 3,803,096 A | 4/1974 | Matern | |
| 4,003,141 A | 1/1977 | Le Roy | |
| 4,182,054 A | 1/1980 | Wise et al. | |
| 4,708,836 A | 11/1987 | Gain et al. | |
| 4,773,865 A | 9/1988 | Baldwin | |
| 5,061,188 A | 10/1991 | McCollum | |
| 5,156,777 A * | 10/1992 | Kaye | 264/40.1 |
| 5,215,469 A | 6/1993 | Kohnke et al. | |
| 5,518,407 A | 5/1996 | Greenfield et al. | |
| 5,620,326 A | 4/1997 | Younker | |
| 5,803,746 A | 9/1998 | Barrie et al. | |
| 5,945,056 A | 8/1999 | Day et al. | |
| 5,951,301 A | 9/1999 | Younker | |
| 5,967,790 A | 10/1999 | Strover et al. | |
| 6,112,109 A * | 8/2000 | D'Urso | 600/407 |
| 6,206,703 B1 * | 3/2001 | O'Bannon | 434/274 |
| 6,234,804 B1 | 5/2001 | Yong | |
| 6,241,526 B1 | 6/2001 | Auran et al. | |
| 6,336,812 B1 | 1/2002 | Cooper et al. | |
| 6,361,729 B1 | 3/2002 | Strover et al. | |
| 6,409,516 B1 * | 6/2002 | Thill | 434/274 |
| 6,485,308 B1 | 11/2002 | Goldstein | |
| 6,489,022 B1 | 12/2002 | Hamilton et al. | |
| 6,568,941 B1 | 5/2003 | Goldstein | |
| 6,780,016 B1 | 8/2004 | Toly | |
| 6,790,043 B2 | 9/2004 | Aboud | |
| 6,997,719 B2 | 2/2006 | Wellman et al. | |
| 2006/0184004 A1 | 8/2006 | Machida | |
| 2006/0184005 A1 | 8/2006 | Sakezles | |
| 2006/0253761 A1 | 11/2006 | Sakezles | |
| 2007/0003916 A1 | 1/2007 | Sakezles | |
| 2007/0020598 A1 | 1/2007 | Yamashita et al. | |

FOREIGN PATENT DOCUMENTS

| | | |
|---|---|---|
| CA | 664489 | 6/1963 |
| DE | 4212908 | 10/1993 |

(Continued)

*Primary Examiner* — Kurt Fernstrom
(74) *Attorney, Agent, or Firm* — Terrence N. Kuharchuk; Rodman & Rodman

(57) ABSTRACT

A training model for use in training to perform a medical procedure which is invasive of a skull, such as the insertion of an external ventricular drain or the evacuation of a subdural hematoma. The training model may comprise a base component defining a training component receptacle and a training component for mounting in the training component receptacle and comprising a skull section. Alternately, the training model may comprise the skull section or the training component in isolation. The skull section comprises an outer skull layer, a middle skull layer and an inner skull layer. The outer skull layer is constructed of an outer skull material which simulates osseous tissue when penetrated. The middle skull layer is constructed of a middle skull material which simulates marrow tissue when penetrated. The inner skull layer is constructed of an inner skull material which simulates osseous tissue when penetrated.

46 Claims, 6 Drawing Sheets

FOREIGN PATENT DOCUMENTS

| | | |
|---|---|---|
| WO | 2005071639 A1 | 8/2005 |
| WO | 2005/088583 | 9/2005 |
| WO | 2005088583 A1 | 9/2005 |
| WO | 2005122105 A2 | 12/2005 |

* cited by examiner

MEDICAL PROCEDURES TRAINING MODEL

This application claims the priority of PCT/CA2007/002145 filed Nov. 29, 2007.

FIELD OF INVENTION

The present invention relates to a training model for use in training the performance of a medical procedure which is invasive of a skull. The training model may be comprised of a base component and a training component comprising a skull section, which together providing a simulated head, or the training model may be comprised of the skull section in isolation.

The training model may simulate a human head and skull for use in the training of doctors and other medical practitioners. Alternately, the training model may simulate an animal head and skull for use in the training of veterinarians or other veterinary medicine practitioners.

BACKGROUND OF INVENTION

Various routine and more complex medical procedures are often required to be performed which are invasive of the skull. Although some procedures may be considered to be relatively routine in nature, all invasive procedures necessarily involve a degree of risk. This risk is enhanced when the procedure is invasive of the skull given the potential damage that may be incurred to the brain and the seriousness of the potential consequences of any unforeseen complications.

For example, the medical procedure may require the insertion of a drain through a patient's skull in order to access the ventricular system of the brain. The drain may be utilized to siphon off cerebrospinal fluid within the ventricles in order to relieve pressure caused by brain swelling. In a further example, the medical procedure may require the insertion of a needle or catheter through a patient's skull in order to access a hematoma, abscess or other fluid-filled structure requiring evacuation.

In order to perform any of these various medical procedures, access must first be gained through the skull. In each of these examples, access to the brain or other anatomical structures within the skull is typically achieved by drilling through the skull. Drilling through the skull must be performed with precision to avoid any potential damage to the brain and other structures located in close proximity to the inner surface of the skull cap. Further, the hole or pathway drilled through the skull is required to be placed accurately in order to permit the successful performance of the subsequent necessary medical procedure.

Thus, it is desirable to provide persons intending to perform such medical procedures with an opportunity to train or practice the procedures without any risk to the patient.

For this purpose, it is desirable to provide a training model comprising a skull section, which permits training in one or both of the drilling of the skull and the subsequent procedure to be performed, such as the insertion of a ventricular drain or evacuation of a hematoma. Such a training model would provide medical practitioners with valuable experience in both routine procedures and in the handling of complications which may arise. Preferably, the training model provides a simulated environment which mimics or closely imitates the conditions of the procedure.

Numerous anatomical training models have been developed to assist in the training of medical practitioners in various procedures.

For instance, many training models provide artificial or simulated arms or legs for teaching medical and nursing students correct techniques for injections or the collection of blood. Examples are provided by the following: U.S. Pat. No. 2,689,415 issued Sep. 21, 1954 to Haver; U.S. Pat. No. 3,789,518 issued Feb. 5, 1974 to Chase; U.S. Pat. No. 4,182,054 issued Jan. 8, 1980 to Wise et. al.; U.S. Pat. No. 5,215,469 issued Jun. 1, 1993 to Kohnke et. al.; and International Publication WO 2005/122105 A2 published Dec. 22, 2005 by Choudhery et. al.

Artificial or simulated limbs are also provided for other training purposes, including the training of peripheral bypass surgery in a saphenous vein as shown in U.S. Pat. No. 5,945,056 issued Aug. 31, 1999 to Day et. al. and the training of endoscopic saphenous vein harvesting as shown in U.S. Pat. No. 6,997,719 issued Feb. 14, 2006 to Wellman et. al., Further, U.S. Pat. No. 5,967,790 issued Oct. 19, 1999 to Strover et. al. and U.S. Pat. No. 6,361,729 issued Mar. 26, 2002 to Strover et. al. provide a model simulating a natural anatomical joint for training surgical techniques including arthroscopic surgery.

Further training models provide artificial or simulated breast tissue including lumps, cysts or other lesions for training the locating and aspirating of a breast cyst or the performance of a needle biopsy. Examples are provided by the following: U.S. Pat. No. 5,803,746 issued Sep. 8, 1998 to Barrie et. al.; U.S. Pat. No. 6,485,308 issued Nov. 26, 2002 to Goldstein; and U.S. Pat. No. 6,568,941 issued May 27, 2003 to Goldstein.

In addition, many training models provide a simulation model of a body or chest cavity or torso, in which are placed various artificial or simulated organs or structures, for training the diagnosis and/or treatment of specific conditions. Thus, the operative, surgical or other procedures to be trained by these models are all performed wholly or substantially within the chest, body or abdominal cavity.

Examples are provided by the following: German Publication No. DE4212908 published Oct. 21, 1993 by Nuemann; U.S. Pat. No. 4,773,865 issued Sep. 27, 1988 to Baldwin; U.S. Pat. No. 5,061,188 issued Oct. 29, 1991 to McCollum; U.S. Pat. No. 5,518,407 issued May 21, 1996 to Greenfield et. al.; U.S. Pat. No. 5,620,326 issued Apr. 15, 1997 to Younker; U.S. Pat. No. 5,951,301 issued Sep. 14, 1999 to Younker; U.S. Pat. No. 6,234,804 issued May 22, 2001 to Yong; U.S. Pat. No. 6,780,016 issued Aug. 24, 2004 to Toly; International Publication WO 2005/071639 A1 published Aug. 4, 2005 by Bunegin et. al.; and International Publication WO 2005/088583 A1 published Sep. 22, 2005 by Stoianovici et. al.

U.S. Pat. No. 6,336,812 issued Jan. 8, 2002 to Cooper et. al. provides an apparatus for the training of various surgical or clinical techniques, wherein the apparatus includes a housing providing a simulation of a body part and an internal body structure for reception in the housing. More particularly, Cooper et. al. describes a housing resembling a human abdominal cavity and an internal body structure simulating a gall bladder and other abdominal organs, vessels and structures. Although Cooper et. al. contemplates that this training apparatus may be extended to other parts of the body, including the brain, no details are provided.

U.S. Pat. No. 6,241,526 issued Jun. 5, 2001 to Auran et. al. provides a training model including a simulated side profile of a child's head and shoulder area, which includes a replica of an ear drum and ear canal. The model is used for training physicians in the procedure of tympanocentesis for treating certain child ear infections.

U.S. Publication 2007/0020598 A1 published Jan. 25, 2007 by Yamashita et. al. provides a nasal model for training endoscopic sinus surgical procedures. The nasal model is comprised of a nasal unit, which is mounted in a simulated face and trunk to allow more realistic surgical training. The nasal unit includes a bone part fitted with right and left ethmoid sinus parts. At least one of the ethmoid sinus parts includes an ethmoid sinus that can be incised and irreversibly broken during surgical manipulation.

Finally, U.S. Publication 2006/0184005 A1 published Aug. 17, 2006 by Sakezles, U.S. Publication 2006/0253761 A1 published Nov. 9, 2006 by Sakezles and U.S. Publication 2007/0003916 A1 published Jan. 4, 2007 by Sakezles describe a number of synthetic anatomical models that are designed to enable simulated use testing of medical devices. The complexity of the models is designed to allow the model to be substituted for either a live animal or an animal or human cadaver in the testing of the medical device. One of the models provided is a neurovasculature model comprising a brain component.

Therefore, there remains a need in the industry for a training model for use in training to perform a medical procedure which is invasive of a skull. Further, there remains a need for a training model comprising a skull section which simulates the skull. As well, there remains a need for a training model which permits training in a medical procedure such as one or both of the drilling of the skull and the performance of a subsequent procedure directed at an anatomical structure or target within the skull.

SUMMARY OF INVENTION

The present invention relates to a training model for use in training to perform a medical procedure which is invasive of a skull. The skull may be a human or animal skull. Accordingly, the training model is preferably comprised of a skull section that simulates the human skull or the animal skull for training purposes. As a result, the invention may be utilized in the training of doctors, residents and other medical students, practitioners or personnel. Alternately, the training model may be utilized in the training of veterinarians and other veterinary medicine practitioners or personnel. Further, the medical procedure may be required or desired to be performed for either treatment or diagnostic purposes.

More particularly, the skull is comprised of a cranium and a mandible. The cranium of the skull is further comprised of a plurality of facial bones and cranial bones. The eight cranial bones comprising the skull may be referred to collectively as the "neurocranium." Preferably, the skull section of the training model simulates the cranium, and more preferably, the neurocranium. In other words, the skull section of the training model preferably simulates one or more of the cranial bones which comprise the skull. In some embodiments, the skull section particularly simulates one or more of the frontal bone, the parietal bones or the temporal bones. In order to enhance the training experience, the skull section is sized and configured or shaped to approximate the size and configuration or shape of the area or portion of the skull of the patient on which the medical procedure to be trained is likely to be actually performed. In other words, the training model is preferably both life-like and life-size where possible.

The training model may be used in training the performance of any medical procedure which is invasive of the skull. More particularly, the medical procedure includes, at least, the penetrating or perforating of the skull, preferably the neurocranium. The skull may be penetrated or perforated by drilling, boring, punching, piercing or any other suitable method capable of forming or providing a desired hole or passage into or through the skull. In one embodiment, the training model is for use in training the performance of a medical procedure comprising the drilling of a hole or passage through the neurocranium of the skull.

As well, the training model also preferably permits the training of personnel in further medical procedures directed at normally occurring or aberrant structures underlying the skull. For example, the medical procedure may be directed at the brain or components thereof, the ventricular system, the meninges, a hematoma or abscess or other fluid-filled cavity within the skull or an anomaly or lesion within the brain. Thus, in one embodiment, the medical procedure is comprised of inserting an external ventricular drain in order to drain an amount of cerebrospinal fluid to relieve pressure within the skull, such as may be caused by swelling of the brain. In a further embodiment, the medical procedure is comprised of evacuating a subdural hematoma.

In some embodiments of the training model, the training model is comprised of the skull section. As indicated, the skull section is provided to simulate, imitate or mimic at least a portion or section of a human or animal skull. More particularly, the skull section is preferably sized, configured and shaped to approximate the size, configuration and shape of at least a portion or section of the human or animal skull, specifically, the portion or section of the skull of the patient on which the medical procedure to be trained is likely to be actually performed.

Thus, in these embodiments, the invention is directed at a training model for use in training to perform a medical procedure which is invasive of a skull, the training model comprising a skull section, the skull section comprising:

(a) an outer skull layer constructed of an outer skull material which simulates osseous tissue when penetrated;

(b) a middle skull layer constructed of a middle skull material which simulates marrow tissue when penetrated; and (c) an inner skull layer constructed of an inner skull material which simulates osseous tissue when penetrated.

In some further embodiments of the training model, the training model is comprised of a base component and a training component comprising the skull section.

Thus, in these further embodiments, the invention is directed at a training model for use in training to perform a medical procedure which is invasive of a skull, the training model comprising:

(a) a base component, the base component defining a training component receptacle; and (b) a training component for mounting in the training component receptacle, the training component comprising a skull section, the skull section comprising:

(i) an outer skull layer constructed of an outer skull material which simulates osseous tissue when penetrated;

(ii) a middle skull layer constructed of a middle skull material which simulates marrow tissue when penetrated; and (iii) an inner skull layer constructed of an inner skull material which simulates osseous tissue when penetrated.

Accordingly, the base component defines the training component receptacle and the training component is adapted or suited for mounting in the training component receptacle. Further, in these embodiments, the training component comprises a skull section which preferably simulates, mimics or imitates a portion of a skull, as discussed above. The base component may have any shape or configuration capable of providing a relatively stable structure, such that the training component is securely maintained in a suitable position to train the medical procedure. In addition, in order to further enhance the training provided by the training model and the overall simulation of the medical procedure, the base component may be shaped or configured to simulate, mimic or imitate the other features or portions of the skull not provided by the training component. Preferably, the base component and the training component together provide a simulated head.

Preferably, the simulated head is sized and configured or shaped to approximate the size and configuration or shape of the head of the patient on which the medical procedure to be trained is likely to be actually performed. In other words, the training model comprised of the simulated head is preferably both life-like and life-size where possible. In this regard, the success of the medical procedure to be trained is often dependent upon the accurate anatomical placement of the hole or passage to be drilled through the skull. Accordingly, the training model preferably provides accurate external anatomic landmarks such that the hole or passage may be successfully placed in the skull section.

The training component may be fixedly or detachably mounted in the training component receptacle by any mechanism or structure or by any method or process suitable for, and capable of, maintaining or securing the training component in the desired position. For instance, the training component may be glued or affixed within the training component receptacle. Alternately, the training component may be releasably, removably or detachably maintained within the training component receptacle by one or more fasteners or fastening mechanisms, such as one or more Velcro™ strips or fasteners.

In one embodiment, the training component is removable from the training component receptacle so that the training component is replaceable. Thus, the training component may be removed and replaced as desired or required by the user of the training model. For instance, use of the training component to train will tend to damage the skull section and/or the other elements or parts of the training component, rendering the training component unusable or ineffective. Accordingly, a replacement training component may be mounted in the training component receptacle as needed.

As well, various training components may be available, wherein each training component is adapted or designed for use in the training of the performance of a specific medical procedure or to more closely simulate a particular medical condition. As a result, depending upon the medical procedure desired to be trained or the medical condition of the patient desired to be simulated, the appropriate training component may be selected and mounted in the training component receptacle.

As discussed, in some embodiments, the training model comprises a skull section. In other embodiments, the training model comprises a training component, wherein the training component comprises a skull section. In either instance, the skull section is comprised of an outer skull layer, a middle skull layer and an inner skull layer to more closely approximate or simulate the anatomical structure of a skull.

More particularly, the skull, including the neurocranium, is generally comprised of flat bones comprising two parallel layers of compact bone, which may be referred to as the "outer table" and the "inner table," sandwiching an intermediate layer of trabecular or spongy bone containing blood vessels and marrow. As used herein, a reference to "osseous tissue" is a reference to compact bone tissue, such as that generally found in the outer and inner tables of the flat bones comprising the skull. Further, as used herein, a reference to "marrow tissue" is a reference to trabecular or spongy bone tissue containing a network of blood vessels and marrow, such as that generally found between the inner and outer tables of the flat bones comprising the skull.

Thus, the outer skull layer is constructed of an outer skull material which simulates osseous tissue when penetrated. In other words, the outer skull layer is comprised of an outer skull material which mimics or imitates osseous tissue, and particularly mimics or imitates the outer table of the skull, when penetrated, pierced or passed into or through. As indicated, in some embodiments, the medical procedure is comprised of drilling into or through a portion of the skull, such as the neurocranium. Thus, in such embodiments, the outer skull layer is particularly comprised of an outer skull material which simulates, mimics or imitates osseous tissue when it is being penetrated by drilling. Thus, for instance, the outer skull material will provide resistance to the passage of a drill therethrough which is substantially similar to the resistance experienced when drilling through the outer table of the skull, such as the outer table of the neurocranium.

Although the outer skull material may be comprised of any material or substance capable of simulating osseous tissue when penetrated, in some embodiments, the outer skull material is comprised of a cement, preferably a Portland cement.

Similarly, the inner skull layer is constructed of an inner skull material which simulates osseous tissue when penetrated. In other words, the inner skull layer is comprised of an inner skull material which mimics or imitates osseous tissue, and particularly mimics or imitates the inner table of the skull, when penetrated, pierced or passed into or through. As indicated above, in some embodiments, the medical procedure is comprised of drilling into or through a portion of the skull, such as the neurocranium. In such embodiments, the inner skull layer is particularly comprised of an inner skull material which simulates, mimics or imitates osseous tissue when it is being penetrated by drilling. Thus, for instance, the inner skull material will provide resistance to the passage of a drill therethrough which is substantially similar to the resistance experienced when drilling through the inner table of the skull, such as the inner table of the neurocranium.

Although the inner skull material may be comprised of any material or substance capable of simulating osseous tissue when penetrated, in some embodiments, the inner skull material is also comprised of a cement, preferably a Portland cement.

Finally, the middle skull layer is constructed of a middle skull material which simulates marrow tissue when penetrated. In other words, the middle skull layer is comprised of a middle skull material which mimics or imitates marrow tissue when penetrated, pierced or passed into or through. As indicated previously, in some embodiments, the medical procedure is comprised of drilling into or through a portion of the skull, such as the neurocranium. In such embodiments, the middle skull layer is particularly comprised of a middle skull material which simulates, mimics or imitates marrow tissue when it is being penetrated by drilling. Thus, for instance, the middle skull material will provide resistance to the passage of a drill therethrough which is substantially similar to the resistance experienced when drilling through the intermediate layer of the skull between the inner and outer tables, such as the inner and outer tables of the neurocranium.

Although the middle skull material may be comprised of any material or substance capable of simulating marrow tissue when penetrated, in some embodiments, the middle skull material is comprised of a urethane foam.

Further, in some embodiments, the training model, or the training component of the training model, further comprises a dural layer underlying the inner skull layer such that the inner skull layer is interposed between the middle skull layer and the dural layer, and wherein the dural layer is constructed of a dural layer material which simulates dural tissue when penetrated.

More particularly, the meninges comprise three membranes or layers of connective tissue which surround or envelope the structures of the central nervous system, including the brain. The outermost layer of the meninges, or the layer closest to the skull, is the dura mater. The dura mater is a relatively thick, durable membrane comprised of relatively dense fibrous tissue. As used herein, a reference to "dural tissue" is a reference to the tissue comprising the dura mater.

Thus, the dural layer is constructed of a dural layer material which simulates dural tissue when penetrated. In other words, the dural layer is comprised of a dural layer material which mimics or imitates dural tissue when penetrated, pierced or passed into or through. As indicated previously, in some embodiments, the medical procedure is comprised of drilling into or through a portion of the skull, such as the neurocranium. Following drilling of the skull, the medical procedure may further require the penetration of the dura mater to access the brain or other underlying structures. In this instance, the dura mater is typically cut or incised. In such embodiments, the dural layer is particularly comprised of a dural layer material which simulates, mimics or imitates dural tissue when it is being penetrated by cutting or incision. Thus, for instance, the dural layer material will provide resistance to incision which is substantially similar to the resistance experienced when incising the dura mater.

Although the dural layer material may be comprised of any material or substance capable of simulating dural tissue when penetrated, in some embodiments, the dural layer material is comprised of a plastic film.

In addition, in some embodiments, the training model, or the training component of the training model, further comprises a brain layer underlying the inner skull layer such that the inner skull layer is interposed between the middle skull layer and the brain layer, and wherein the brain layer is constructed of a brain layer material which simulates brain tissue when penetrated. In this instance, the training model, or training component of the training model, may or may not comprise the dural layer, as described above.

However, where the brain layer is provided, a dural layer is also preferably provided in order to more realistically simulate the anatomical structure of the brain and meninges. In such embodiments, the training model, or the training component of the training model, further comprises a dural layer underlying the inner skull layer such that the dural layer is interposed between the inner skull layer and the brain layer, wherein the dural layer is constructed of a dural layer material which simulates dural tissue when penetrated.

More particularly, the brain is comprised of gray matter, white matter, spaces therebetween filled with cerebrospinal fluid and various other components. As used herein, a reference to "brain tissue" is a collective reference to the tissues comprising the various components of the brain.

Thus, the brain layer is constructed of a brain layer material which simulates brain tissue when penetrated. In other words, the brain layer is comprised of a brain layer material which mimics or imitates brain tissue when penetrated, pierced or passed into or through. In some embodiments, the medical procedure is comprised of inserting or passing a trocar, catheter, drain or other surgical instrument into or through a portion of the brain. In such embodiments, the brain layer is particularly comprised of a brain layer material which simulates, mimics or imitates brain tissue when it is being penetrated by advancing a surgical instrument therethrough. Thus, for instance, the brain layer material will provide resistance to penetration which is substantially similar to the resistance experienced when penetrating the brain.

In this regard, the specific make-up or composition of the brain tissue, and thus the resistance to penetration provided by the brain tissue, may vary depending upon the area or region of the brain to be penetrated during the intended medical procedure and the medical condition of the patient. Accordingly, the brain layer material may be selected taking into account the medical procedure to be trained, including the area or region of the brain to be simulated by the brain layer and the anticipated medical condition of the patient.

Although the brain layer material may be comprised of any material or substance capable of simulating brain tissue when penetrated, in some embodiments, the brain layer material is comprised of at least one wax, or wax-like substance.

As well, in some embodiments, in order to enhance the simulation of the medical procedure, the training model, or the training component of the training model, further comprises a skin layer overlying the outer skull layer such that the outer skull layer is interposed between the skin layer and the middle skull layer, wherein the skin layer is constructed of a skin layer material which simulates skin tissue when penetrated. If desired, the base component of the training model may also comprise a skin layer to render the training model more realistic. Further, the base component also preferably provides one or more external anatomic landmarks, such as those likely to be relied upon by the medical practitioner in the placement of the hole or passage to be drilled through the skull.

More particularly, the skin, and particularly the portion of the skin covering the skull, including the neurocranium, comprises a plurality of layers of epithelial and other tissues such as the epidermis, dermis and hypodermis. As used herein, a reference to "skin tissue" is a collective reference to the epithelial and other tissues comprising the various layers of the skin.

Thus, the skin layer is constructed of a skin layer material which simulates skin tissue when penetrated. In other words, the skin layer is comprised of a skin layer material which mimics or imitates skin tissue when penetrated, pierced or passed into or through. As indicated, in some embodiments, the medical procedure is comprised of drilling into or through a portion of the skull, such as the neurocranium. However, prior to drilling or otherwise penetrating the skull, the medical procedure may further require the penetration of the skin in order to provide access to the skull for the subsequent procedures. In this instance, the skin is typically cut or incised. In such embodiments, the skin layer is particularly comprised of a skin layer material which simulates, mimics or imitates skin tissue when it is being penetrated by cutting or incision. Thus, for instance, the skin layer material will provide resistance to incision which is substantially similar to the resistance experienced when incising the skin.

Although the skin layer material may be comprised of any material or substance capable of simulating skin tissue when penetrated, in some embodiments, the skin layer material is comprised of a silicone rubber.

Further, depending upon the specific medical procedure to be trained, in some embodiments, the training model, or the training component of the training model, also comprises a target underlying the inner skull layer such that the inner skull layer is interposed between the middle skull layer and the target. However, the specific location of the target underlying the inner skull layer may vary depending upon the nature of the target, which is itself dependent upon the nature of the medical procedure.

For example, the medical procedure to be trained may be directed at, or related to, the ventricles or the ventricular system of the brain. In this instance, the medical procedure may be comprised of inserting a drain or other surgical instrument through the brain to access the ventricles to permit the withdrawal of an amount of cerebrospinal fluid contained within the ventricles. As a result, the target comprising the training model will be selected and located within the training model to simulate, mimic or imitate the ventricles of the brain in order to facilitate the training of the performance of this medical procedure.

For further example, the medical procedure to be trained may be directed at, or related to, a hematoma, an abscess, a tumor, a lesion or another structure underlying the skull. In this instance, the medical procedure may be comprised of inserting a needle, catheter or other surgical instrument through the skull in order to access the underlying structure for various purposes. As a result, the target comprising the training model will again be selected and positioned within the training model to simulate, mimic or imitate the hematoma, the abscess, the tumor, the lesion or the other structure which is the focus of the medical procedure to be trained.

Accordingly, in general terms, the target of the training model and its preferred location within the training model are selected to simulate, mimic or imitate a specific structure underlying the skull of a patient which is the focus of the medical procedure to be trained by the training model. The specific structure may be a normal or aberrant anatomical structure, a lesion, a structure resulting from a pathological condition or other structure which is desired to be acted upon by the medical practitioner. For example, as noted above, the specific structure may be the brain or components thereof, the meninges or the ventricles. Further, the specific structure may be a hematoma, an abscess, a tumor, a fluid filled cavity or an anomaly or lesion within the skull.

As a result, the training model, or the training component of the training model, may comprise a dural layer underlying the inner skull layer such that the dural layer is interposed between the inner skull layer and the target, wherein the dural layer is constructed of a dural layer material which simulates dural tissue when penetrated, as described previously. In other words, the dural layer will be required to be penetrated in order to access the target.

In some embodiments, the target is a hematoma target. Specifically, the hematoma target is preferably a subdural hematoma target. In this embodiment, the medical procedure to be trained may be comprised of evacuating a subdural hematoma. Thus, to provide the desired simulation, the hematoma target is preferably positioned adjacent or in close proximity to the dural layer such that the target underlies the dural layer. As a result, the dural layer is required to be penetrated in order to access the hematoma target. The presence of a brain layer is not typically required in this instance to provide a realistic simulation of the medical procedure. Accordingly, the brain layer may not be present in the training model.

The hematoma target may be comprised of any material or materials, and may have any shape, configuration and dimensions, capable of and suitable for simulating, mimicking or imitating a hematoma, and more preferably a subdural hematoma. A hematoma is simply a collection of blood, while a subdural hematoma is a collection of blood located in a separation of the arachnoid from the dura mater.

In some embodiments, the hematoma target is comprised of a hematoma chamber for containing a simulated blood. The simulated blood may be comprised of any fluid which mimics or imitates blood, such as a red-colored water. Further, in some embodiments, the hematoma chamber is comprised of a balloon, preferably a latex balloon.

Alternately, the training model, or the training component of the training model, may further comprise a brain layer underlying the inner skull layer such that the brain layer is interposed between the inner skull layer and the target, wherein the brain layer is constructed of a brain layer material which simulates brain tissue when penetrated, as described previously. In other words, the brain layer will be required to be penetrated in order to access the target.

In this case, in order to enhance the simulated medical procedure, the training model, or the training component of the training model, may further comprise the dural layer underlying the inner skull layer such that the dural layer is interposed between the inner skull layer and the brain layer, wherein the dural layer is constructed of a dural layer material which simulates dural tissue when penetrated, as described previously. In other words, both the dural layer and the brain layer will be required to be penetrated in order to access the target.

In some embodiments, the target is a ventricle target. In this embodiment, the medical procedure to be trained may be comprised of the inserting of a catheter or drain for the withdrawal of an amount of cerebrospinal fluid from the ventricular system of the brain. Thus, to provide the desired simulation, the ventricle target is preferably positioned such that the ventricle target underlies at least a portion of the brain layer. As a result, the brain layer is required to be penetrated in order to access the ventricle target. Preferably, the dural layer is also present such that both the dural layer and the brain layer are required to be penetrated to access the ventricle target.

The ventricle target may be comprised of any material or materials, and may have any shape, configuration and dimensions, capable of and suitable for simulating, mimicking or imitating a ventricle or a portion or component of the ventricular system of the brain. The ventricular system is comprised of four ventricles for the production and containment of cerebrospinal fluid therein.

In some embodiments, the ventricle target is comprised of a ventricle chamber for containing a simulated cerebrospinal fluid. The simulated cerebrospinal fluid may be comprised of any fluid which mimics or imitates cerebrospinal fluid, such as a clear water. Further, in some embodiments, the ventricle chamber is comprised of a balloon, preferably a latex balloon.

In some further embodiments, the training model, or the training component of the training model, is further comprised of a pressurization device for pressurizing the simulated cerebrospinal fluid which is contained in the ventricle chamber. The pressurization device may be comprised of any device or mechanism capable of providing a desired amount of pressure to the simulated cerebrospinal fluid in the ventricle chamber. Preferably, the pressurization device permits a preselected pressure to be applied and further permits the preselected pressure to be varied, such as may be required to simulate various medical conditions of the patient and various medical procedures to be trained on such patients. The pressurization device may be connected to, or may communicate with, the ventricle target in any manner and by any connector or connection mechanism permitting the pressurization device to pressurize the ventricle chamber. A similar pressurization device may also be used with other targets where desired to simulate a particular medical condition of the patient or procedure to be trained.

Finally, one or more alarms or sensors may be associated with one or more of the components of the training model, including the skin layer, the skull section, the dural layer, the brain layer and the target. Each alarm or sensor may be provided for monitoring a particular condition of the component, for signaling the occurrence of a particular event or complication of the medical procedure being trained or for otherwise providing positive and/or negative feedback with respect to the performance of the medical procedure being trained.

SUMMARY OF DRAWINGS

Embodiments of the invention will now be described with reference to the accompanying drawings, in which.

DETAILED DESCRIPTION

Figures 1, 2:
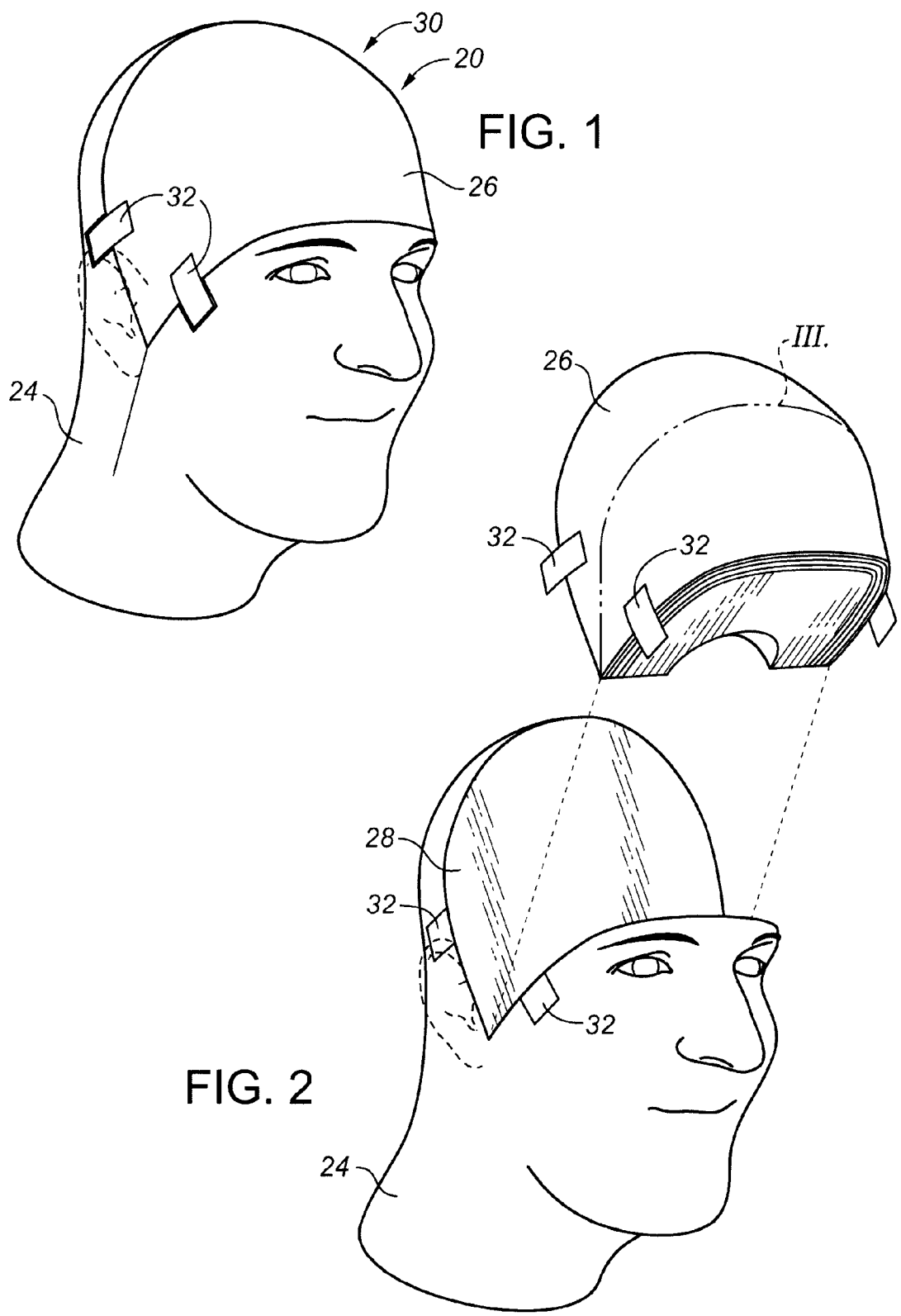
FIG. 1 is a perspective view of an embodiment of the training model comprising a training component and a base component, which together provide a simulated head.
FIG. 2 is a further perspective view of the training model of FIG. 1, showing the training component removed from the base component.

Referring to FIGS. 1-5, a training model (20) is provided for use in training a person to perform a medical procedure which is invasive of a skull. The training model (20) may be adapted or designed to simulate any animal skull or a portion thereof. Thus, the person to be trained may be a veterinarian, veterinary student or other veterinary medicine practitioner or personnel. However, the training model (20) is preferably adapted or designed to simulate a human skull or a portion thereof. Thus, the person to be trained may be a medical doctor, resident, medical student or other medical practitioner or personnel. Accordingly, although the training model (20) is described herein primarily with reference to a human skull and patient, it is intended that the training model (20) may be adapted and configured as necessary to simulate an animal skull and patient.

The medical procedure to be trained utilizing the training model (20) may be required or desired to be performed on the patient for either treatment or diagnostic purposes. In either event, as indicated, the medical procedure is invasive of the skull. More particularly, the medical procedure to be trained comprises the penetrating of a portion or area of the skull, preferably the neurocranium. Penetrating of the skull may comprise perforating, drilling, boring, punching, piercing or any other suitable method capable of forming or providing a desired hole or passage into or through the desired portion of the skull. In one embodiment, the training model (20) is for use in training the performance of a medical procedure comprising the drilling of a hole or passage through a portion of the neurocranium of the skull.

Further, once the skull is penetrated, the medical procedure to be trained by the training model (20) may comprise further steps in the diagnosis or treatment of various medical conditions involving either normally occurring or aberrant or anomalous structures or anatomical features underlying the skull.

In one embodiment, the medical procedure to be trained is directed at the ventricular system of the brain. Specifically, the medical procedure comprises inserting a drain through the brain to the ventricular system in order to permit the withdrawal of an amount of cerebrospinal fluid. In a further embodiment, the medical procedure to be trained is directed at a subdural hematoma. Specifically, the medical procedure comprises evacuating the subdural hematoma.

Thus, the training model (20) is comprised of a skull section (22). The skull section (22) simulates, mimics or imitates at least a portion or defined area of the skull at which the medical procedure is directed or focused. Preferably, the skull section (22) specifically simulates, mimics or imitates a portion or defined area of the neurocranium, such as one or more of the frontal bone, the parietal bones or the temporal bones.

The training model (20) is comprised of the skull section (22). However, in some embodiments, the skull section (22) forms or comprises only one part or component of the training model (20). Specifically, in some embodiments of the training model (20), the training model (20) is comprised of a base component (24) and a training component (26), wherein the training component (26) comprises the skull section (22).

Figure 5:
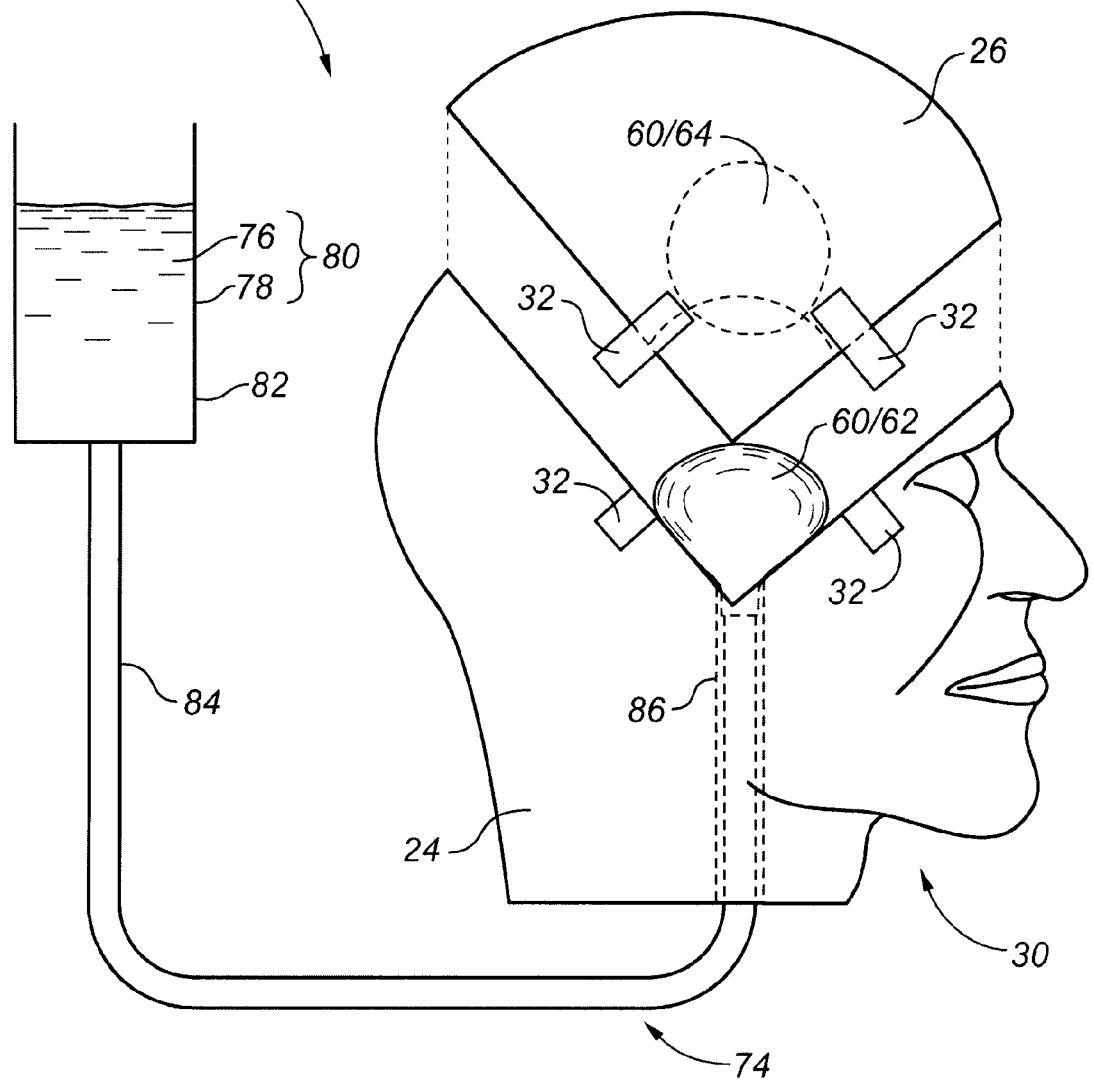
FIG. 5 is a side view of the training model of FIG. 1, further showing a pressurization device.

Referring to FIGS. 1, 2 and 5, the base component (24) defines a training component receptacle (28) which is sized and configured for receipt of the training component (26) therein. Thus, the training component (26) is sized, configured or otherwise adapted to be compatible with, or complementary to, the base component (24), and particularly the training component receptacle (28), such that the base component (24) and the training component (26) may be assembled to provide the training model (20).

The base component (24) may have any size, shape and configuration capable of maintaining the training component (26), mounted within the training component receptacle (28), in a position suitable for performing the medical procedure to be trained. Further, the base component (24) is adapted or configured to maintain the training component (26) in a relatively stable or fixed position throughout the performance of the medical procedure to be trained.

In some embodiments, the base component (24) is shaped or configured to simulate the balance of a complete or full skull, or at least the balance of the neurocranium of the skull. In other words, the training component (26) comprises a skull section (22), while the base component (24) comprises a further portion of a complete skull. In some embodiments, as shown in FIG. 1, the base and training components (24, 26) together provide a complete simulated skull or together provide a simulated head (30). The simulated head (30) provided by the training model (20) enhances the "reality" of the overall training experience.

In addition, the base and training components (24, 26) of the training model (20), and particularly the simulated head (30), also preferably provide one or more external anatomic landmarks, such as those likely to be relied upon by the medical practitioner in the placement of the hole or passage to be drilled through the skull. In this regard, the location of the hole or passage through the skull of the patient is often critical for the success of the medical procedure. Accordingly, external anatomic landmarks are provided by the simulated head (30) in order to provide training in the correct placement of the hole or passage in the skull. Thus, the training model (20), and particularly the simulated head (30), are sized, configured and shaped to approximate and closely resemble the size, configuration and shape of the head of a patient on which the medical procedure is to be performed. In other words, the simulated head (30) is preferably both "life-like" and "life-sized."

The base component (24) may be comprised of any composition or materials suitable for providing the training component receptacle (28), and preferably suitable for being cast, molded or otherwise configured to provide the simulated head (30) when assembled with the training component (26). For instance, the base component (24) may be comprised of any suitable casting compound, casting composition or plaster. Preferably, the base component (24) is comprised of a urethane resin. However, the base component (24) may also be comprised of an epoxy casting compound or a urethane foam. Further, the base component (24) preferably provides a Shore D (Durometer) scale hardness of at least about 70 following curing.

In a preferred embodiment, the base component (24) is comprised of a urethane casting resin, which may be tinted with flesh colored dye or pigment, and which is commercially available under the name Smooth Cast™. More preferably, the base component (24) is comprised of a urethane casting resin commercially available as the Smooth Cast™ 300 Series, and more preferably as Smooth Cast™ 310. Smooth Cast™ is a trade-mark of Smooth-On Inc. (Pennsylvania, U.S.A.)

In addition, if desired to further enhance the learning experience, the training model (20) may further include a body portion (not shown) for affixing to or attaching with the simulated head (30). Given that the body portion is not directly acted upon in the training of the medical procedure, the body portion may be comprised of any anatomical, training or surgical manikin suitable for the purpose, or any materials or components suitable for use in the manufacture of a manikin, so long as the body portion is capable of attachment to the simulated head (30). Preferably, the simulated head (30) is detachably fastened or affixed to the body portion. In this instance, the body portion is preferably relatively life-like and life-sized.

Although the body portion may be used to support the simulated head (30) in a desired orientation, the simulated head (30) may alternately be supported by a base or other supporting structure or support mechanism (not shown) capable of securely maintaining the simulated head (30) in the desired orientation. For instance, the base component (24) may form or be integrally connected with the supporting structure. Alternately, the base component (24) may be releasably attached or fastened with the supporting structure. In any event, the supporting structure securely maintains the simulated head (30) in an orientation which is compatible with the performance of the medical procedure to be trained. For instance, in the exemplary embodiments provided herein, the simulated head (30) is preferably maintained such that the face or front of the simulated head (30) is facing upwards or away from the support structure to simulate a patient lying on his back on a surgical table.

As indicated, the training component (26) and the training component receptacle (28) are complementary or compatible such that when the training component (26) is mounted in the training component receptacle (28), together they provide the simulated head (30). Further, the configuration and dimensions of the training component (26) and the training component receptacle (28) are complementary or compatible such that the training component (26) may be received and fixedly or releasably mounted in the training component receptacle (28).

Preferably, to permit the replacement or substitution of the training component (26), the training component (26) is detachably mounted in the training component receptacle (28). Any detachable or releasable fastener or fastening mechanism may be used which is capable of securing the training component (26) in the receptacle (28), while also permitting the training component (26) to be readily detached, released or removed as desired or required. In a preferred embodiment, the training component (26) is releasably or detachably mounted within the training component receptacle (28) by one or more Velcro™ fastening strips (32) positioned between one or more adjacent or abutting surfaces of the training component (26) and the receptacle (28), as shown in FIG. 5.

Thus, the training component (26) may be removed from the training component receptacle (28) and replaced with an alternate, replacement or substitute training component (26) as desired or required by the user of the training model (20). For instance, a replacement training component may be required where the previous training component (30) is damaged during the training of the medical procedure. An alternate training component may be required when using the training model (20) for a different medical procedure or for a different medical condition of the patient. In other words, each training component (26) may be adapted or designed for use in the training of the performance of a specific medical procedure or condition of the patient.

Alternately, as indicated, the training model (20) may not include the base component (24). In this instance, the other components comprising the training model (20), such as the training component (26) in isolation, may be supported directly by the supporting structure or support mechanism (not shown). Specifically, the supporting structure may securely maintain the training model (20), without the other components of the simulated head (30), in the desired orientation. In such an embodiment, the training model (20) may be releasably attached or fastened with the supporting structure such that the training model (20) may be removed from the supporting structure and replaced with an alternate, replacement or substitute training component (26) as desired or required by the user of the training model (20).

Figure 3:
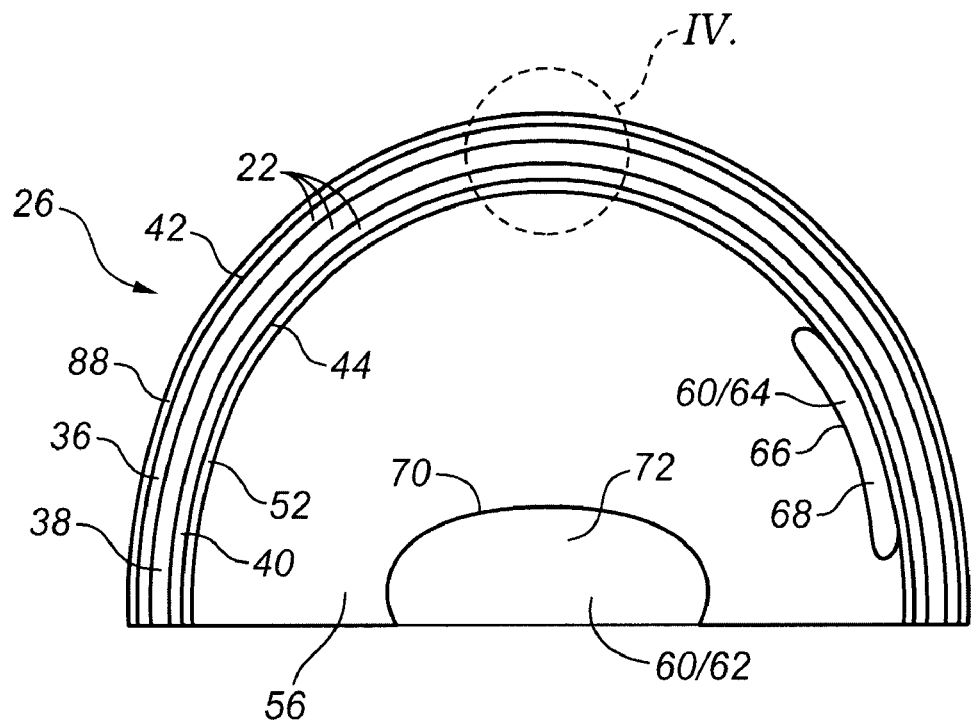
FIG. 3 is a sectional view of the training component taken along line III of FIG. 2.
Figure 4:
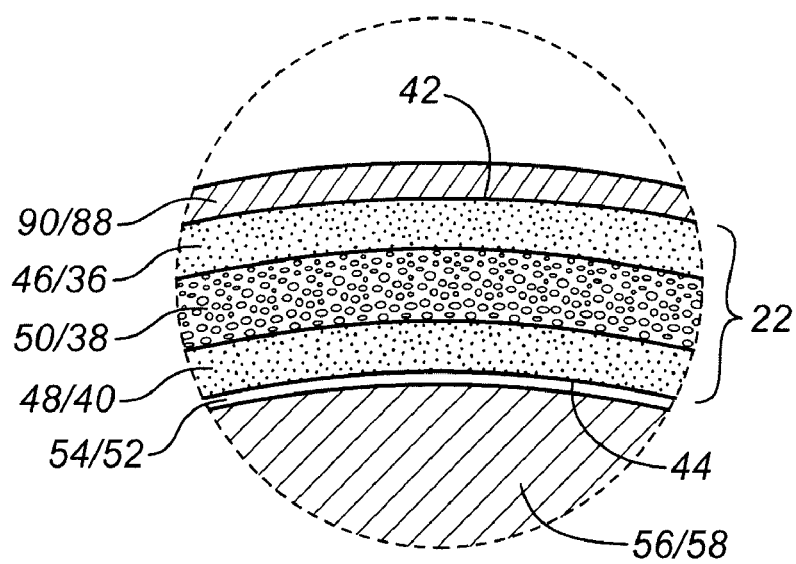
FIG. 4 is a detailed sectional view of a portion of the training component as shown by line IV of FIG. 3.

In each instance, the training model (20) is comprised of the skull section (22). Referring to FIGS. 3 and 4, the skull section (22) is comprised of an outer skull layer (36), a middle skull layer (38) and an inner skull layer (40). As shown in the Figures, the middle skull layer (38) is intermediate the inner and outer skull layers (40, 36). Further, when positioned in the training model (20), the outer skull layer (36) provides an outermost surface (42) of the skull section (22), while the inner skull layer (40) provides an innermost surface (44) of the skull section (22).

The outer skull layer (36) is constructed of an outer skull material (46) which simulates osseous tissue when penetrated. Thus, the outer skull material (46) of the skull section (22) mimics or imitates osseous tissue when penetrated, pierced or passed into or through. In the exemplary embodiments described herein, the medical procedure is comprised of drilling into or through a portion of the skull, which is simulated by the skull section (22). Thus, in such embodiments, the outer skull material (46) particularly simulates, mimics or imitates the "feel" and resistance of osseous tissue when it is being penetrated by drilling.

Similarly, the inner skull layer (40) is constructed of an inner skull material (48) which simulates osseous tissue when penetrated. Thus, the inner skull material (48) of the skull section (22) also mimics or imitates osseous tissue when penetrated, pierced or passed into or through. Thus, in the exemplary embodiments, as indicated above, the inner skull material (48) particularly simulates, mimics or imitates the "feel" and resistance of osseous tissue when it is being penetrated by drilling.

Each of the outer and inner skull materials (46, 48) may be comprised of any material or substance capable of simulating osseous tissue as described. Further, the outer and inner skull materials (46, 48) may be comprised of different materials or substances. However, in some embodiments, the outer and inner skull materials (46, 48) are comprised of the same material or substance.

For instance, in some embodiments, the outer and inner skull materials (46, 48) may each be comprised of a cement, preferably a hydraulic cement. More particularly, the hydraulic cement is preferably comprised of a Portland cement. In addition, the cement is preferably a quick setting cement. Finally, the cement preferably provides a Shore D (Durometer) scale hardness of about 80-90 following curing, which imitates the typical hardness of osseous tissue when penetrated.

In a preferred embodiment, the outer and inner skull materials (46, 48) are comprised of LePage™ Poly Super Strength Cement-Concrete patch material, which is comprised of Portland cement, crystalline silica and calcium aluminate cement. LePage™ is a trade-mark of Henkel Corporation and Henkel Canada Corporation.

In addition, in order to more closely simulate the skull, each of the outer skull layer (36) and the inner skull layer (40) preferably has a thickness which approximates that of the outer and inner tables respectively of the human skull. In some embodiments, each of the outer skull layer (36) and the inner skull layer (40) has a thickness which particularly approximates that of the outer and inner tables respectively of the portion or area of the neurocranium typically penetrated in performance of the medical procedure to be trained. In a preferred embodiment, each of the outer skull layer (36) and the inner skull layer (40) has a thickness of about 2-3 millimeters.

The middle skull layer (38) is constructed of a middle skull material (50) which simulates marrow tissue when penetrated. In other words, the middle skull material (50) of the skull section (22) mimics or imitates marrow tissue when penetrated, pierced or passed into or through. In the exemplary embodiments described above, the middle skull material (50) particularly simulates, mimics or imitates the "feel" and resistance of marrow tissue when it is being penetrated by drilling.

The middle skull material (50) may be comprised of any material or substance capable of simulating marrow tissue as described. However, in some embodiments, the middle skull material (50) may be comprised of a urethane foam, such as a polyurethane foam.

In addition, in order to more closely simulate the skull, the middle skull layer (38) preferably has a thickness which approximates that of the layer or space intermediate the outer and inner tables of the human skull. In some embodiments, the middle skull layer (38) has a thickness which particularly approximates that of the intermediate space or layer between the outer and inner tables of the portion or area of the neurocranium typically penetrated in performance of the medical procedure to be trained. In a preferred embodiment, the middle skull layer (38) has a thickness of about 3-4 millimeters.

Thus, in a preferred embodiment, the skull section (22) of the training model (20), comprising the outer, middle and inner skull layers (36, 38, 40), has a total thickness of about 7-10 millimeters.

Further, as shown in FIGS. 3 and 4, in some embodiments, a dural layer (52) may be provided which underlies the skull section (22). Preferably, the dural layer (52) abuts or lies adjacent to the innermost surface (44) of the skull section (22). In other words, the dural layer (52) underlies the inner skull layer (40) such that the inner skull layer (40) is interposed between the middle skull layer (38) and the dural layer (52).

The dural layer (52) is constructed of dural layer material (54) which simulates dural tissue when penetrated. Thus, the dural layer material (54) mimics or imitates dural tissue when penetrated, pierced or passed into or through. In the exemplary embodiments described herein, following drilling of the skull, the medical procedure may further require the penetration of the dura mater by cutting or incising. Thus, in such embodiments, the dural layer material (54) particularly simulates, mimics or imitates the "feel" and resistance of dural tissue when it is being penetrated by cutting or incising.

The dural layer material (54) may be comprised of any material or substance capable of simulating dural tissue as described. For instance, in some embodiments, the dural layer material (54) may be comprised of a plastic film, which may also be referred to as a plastic wrap, cling wrap or cling-film. Although any suitable plastic film may be used, the plastic film may be particularly comprised of a polyvinylchloride (PVC) plastic, such as a polyvinylidene chloride (PVDC). Alternately, the plastic film may be comprised of polyethylene or low density polyethylene (LDPE). In a preferred embodiment, the plastic film is comprised of a plastic film or plastic wrap comprised of a Saran plastic and commercially known as Saran Wrap™. Saran Wrap™ is a trade-mark of S. C. Johnson & Son, Inc.

In addition, the dural layer (52) preferably has a thickness which approximates that of the dura matter underlying the inner table of the skull. In some embodiments, the dural layer (52) has a thickness which particularly approximates that of the dura mater underlying the inner table of the portion or area of the neurocranium typically penetrated in performance of the medical procedure to be trained. In a preferred embodiment, the dural layer (52) has a thickness of between about 0.007 millimeters and 0.015 millimeters (between about 7 to 15 micrometers), and more preferably has a thickness of about 0.01 millimeters (about 10 micrometers).

Further, as shown in FIGS. 3 and 4, in some embodiments, a brain layer (56) may be provided which underlies the skull section (22), and particularly underlies the innermost surface (44) of the skull section (22) such that the inner skull layer (40) is interposed between the middle skull layer (38) and the brain layer (56). Where both the dural layer (52) and the brain layer (56) are provided, the brain layer (56) preferably abuts or lies adjacent to the dural layer (52). In other words, the dural layer (52) is underlying the inner skull layer (40) in abutment with the innermost surface (44) of the skull section (22), while the brain layer (56) is underlying the dural layer (52). Thus, the dural layer (52) is interposed between the inner skull layer (40) and the brain layer (56).

However, depending upon the medical procedure to be trained, the training model (20) need not include the brain layer (56). Specifically, in some medical procedures, the medical procedure is directed at structures directly underlying the skull or the dura mater. In these instances, the brain will not be penetrated during the medical procedure. Thus, the brain layer (56) will not be required in the training model (20) for that procedure.

Where a brain layer (56) is present, the brain layer (56) is constructed of brain layer material (58) which simulates brain tissue when penetrated. Thus, the brain layer material (58) mimics or imitates brain tissue when penetrated, pierced or passed into or through. In the exemplary embodiments described herein, following the cutting or incising of the dura mater, the medical procedure may comprise penetration of the brain by inserting or passing a trocar, catheter, drain or other surgical instrument into or through a portion of the brain.

Thus, in such embodiments, the brain layer material (58) particularly simulates, mimics or imitates the "feel" and resistance of brain tissue when it is being penetrated in this manner. However, the specific nature and composition of the brain tissue being penetrated may vary depending upon the particular medical condition of the patient and the procedure to be trained. Accordingly, the brain layer material (58) is specifically selected to simulate, mimic or imitate the "feel" and resistance of the brain tissue likely to be encountered in the context of the patient's medical condition and the performance of the medical procedure being trained.

Accordingly, the brain layer material (58) may be comprised of any material or substance capable of simulating brain tissue as described. For instance, in some embodiments, the brain layer material (58) may be comprised of at least one wax, such as a natural or artificial wax or a wax-like substance. For instance, the wax may be an animal or insect wax, a vegetable wax, a mineral wax, a petroleum wax or a synthetic wax. In some embodiments, the brain layer material (58) is comprised of a plurality of waxes or a wax mixture including a solid wax, being a wax in a solid state, and a liquid paraffin wax, being a paraffin wax in a liquid state.

In a preferred embodiment, the brain layer material (58) is comprised of a mixture of the solid wax and the liquid paraffin wax, preferably in a ratio of about 100:35. In addition, the preferred wax mixture preferably provides a Shore A (Durometer) scale hardness of less than about 5, which imitates the typical hardness of brain tissue when penetrated. Finally, the preferred wax mixture preferably has a melting point of about 60° Celsius and a density of about 0.9 g/cm$^3$.

The brain layer (56) preferably has a thickness which approximates the thickness of the brain tissue likely to be encountered in the performance of the medical procedure to be trained. As indicated, in some medical procedures, the medical procedure is directed at the brain or structures lying within the brain. Thus, the thickness of the brain layer (56) will be selected to simulate the location within the brain, or the location of a structure within the brain, at which the medical procedure is directed.

Further, as shown in FIGS. 3 and 5, depending upon the specific medical procedure to be trained, in some embodiments of the training model (20), a target (60) may be provided which underlies the skull section (22), and particularly underlies the innermost surface (44) of the skull section (22), such that the inner skull layer (40) is interposed between the middle skull layer (38) and the target (60). However, the specific location of the target (60) underlying the skull section (22) may vary depending upon the nature of the target (60) and the nature of the medical procedure to be trained which is directed at the target (60).

In general terms, the target (60) is intended to simulate, mimic or imitate a specific structure underlying the skull of a patient which is the focus of the medical procedure to be trained or at which the medical procedure is directed. The specific structure or focus of the medical procedure may be any normal or aberrant anatomical structure, lesion, structure resulting from a pathological condition or other structure desired to be acted upon by the medical practitioner.

In one exemplary embodiment, the specific structure to be acted upon, or at which the medical procedure is directed, is the ventricular system of the brain. Thus, in this embodiment, the target (60) is comprised of a ventricle target (62). In a further exemplary embodiment, the specific structure to be acted upon, or at which the medical procedure is directed, is a hematoma, particularly a subdural hematoma. Thus, in this further embodiment, the target (60) is comprised of a hematoma target (64).

Referring to FIGS. 3 and 5, in both exemplary embodiments, the target (60) is preferably positioned underlying the dural layer (52) such that the dural layer (52) is interposed between the inner skull layer (40) and the target (60). Accordingly, the dural layer (52) will be required to be penetrated in order to access the target (60).

Further, the hematoma target (64) is preferably located or positioned adjacent or in close proximity to, or in abutment with, the innermost surface of the dural layer (52) in order to simulate a subdural hematoma. In addition, the hematoma target (64) may be positioned underlying any portion or area of the skull section (22) to simulate a particular location of the hematoma in a skull. For instance, referring to FIG. 3, the hematoma target (64) is preferably positioned underlying the portion or area of the skull section (22) which is adjacent or in close proximity to the anatomical location of the ear in the skull, along a side of the training component (26), in order to more closely simulate the most likely position of a subdural hematoma underlying the neurocranium.

In contrast, the ventricle target (62) is preferably located or positioned a spaced distance from the innermost surface of the dural layer (52). In this instance, the brain layer (56) is preferably provided underlying the dural layer (52), wherein at least a portion of the brain layer (56) is interposed between the dural layer (52) and the ventricle target (62) in order to simulate the ventricular system of the brain. Accordingly, the brain layer (56), or a portion thereof, will be required to be penetrated in order to access the ventricle target (62).

The specific location of the ventricle target (62) within or underlying the brain layer (56) will be selected to closely approximate the location of the ventricles within the brain. For instance, in a preferred embodiment of the training model (20), upon cross section of the simulated head (30), the ventricle target (62) is positioned approximately centrally, being about 45 millimeters from the front or face of the simulated head (30) and about 45 millimeters from each of the sides of the simulated head (30). Further, upon longitudinal section of the simulated head (30), the ventricle target (62) is positioned about 75 millimeters from the top of the simulated head (30).

The target (60) may be comprised of any material or materials, and may have any shape, configuration and dimensions, capable of and suitable for simulating, mimicking or imitating the specific structure underlying the skull of a patient which is the focus of the medical procedure to be trained or at which the medical procedure is directed.

Thus, in one exemplary embodiment, the hematoma target (64) may be comprised of any material or materials capable of and suitable for simulating, mimicking or imitating a hematoma, and more preferably a subdural hematoma. Preferably, the hematoma target (64) is comprised of a hematoma chamber (66) for containing a simulated blood (68).

The hematoma chamber (66) may be comprised of any container, housing, enclosure or enclosing structure capable of containing the simulated blood (68) and capable of simulating the "feel" and resistance provided by a hematoma when placing or inserting a drain, catheter or other surgical instrument therein to evacuate a collection of blood. In a preferred embodiment, the hematoma chamber (66) is comprised of a balloon. The balloon may be comprised of any suitable material permitting the expansion of the hematoma chamber (66) to accommodate a desired amount of the simulated blood (68), such as rubber, latex, polychloroprene, nylon fabric or like materials. However, the balloon is preferably a latex balloon. The simulated blood (68) may be comprised of any fluid which mimics or imitates blood. In a preferred embodiment, the simulated blood (68) is comprised of a red-colored water.

Further, the hematoma target (64) may have any shape, configuration and dimensions capable of and suitable for simulating, mimicking or imitating a hematoma, preferably a subdural hematoma. In a preferred embodiment, the hematoma target (64) has dimensions of about 90 millimeters by 90 millimeters by 6 millimeters.

In a further exemplary embodiment, the ventricle target (62) may be comprised of any material or materials capable of and suitable for simulating, mimicking or imitating a ventricle or portion or component of the ventricular system of the brain. Preferably, the ventricle target (62) is comprised of a ventricle chamber (70) for containing a simulated cerebrospinal fluid (72).

The ventricle chamber (70) may be comprised of any container, housing, enclosure or enclosing structure capable of containing the simulated cerebrospinal fluid (72) and capable of simulating the "feel" and resistance provided by a ventricle when placing or inserting a drain, catheter or other surgical instrument therein to withdraw a portion or sample of the cerebrospinal fluid. In a preferred embodiment, the ventricle chamber (70) is comprised of a balloon. The balloon may be comprised of any suitable material permitting the expansion of the ventricle chamber (70) to accommodate a desired amount of the simulated cerebrospinal fluid (72), such as rubber, latex, polychloroprene, nylon fabric or like materials. However, the balloon is preferably a latex balloon. The simulated cerebrospinal fluid (72) may be comprised of any fluid which mimics or imitates cerebrospinal fluid. In a preferred embodiment, the simulated cerebrospinal fluid is comprised of a clear water.

Further, the ventricle target (62) may have any shape, configuration and dimensions capable of and suitable for simulating, mimicking or imitating a ventricle. In a preferred embodiment, the ventricle target (62) preferably has dimensions of about 55 millimeters long and 60 millimeters wide.

If desired in order to enhance the simulation of the medical procedure and to more closely imitate the patient's medical condition, a pressurization device (74) may be provided for pressurizing a fluid comprising the target (60). For instance, as shown in FIG. 5, in an embodiment comprising the ventricle target (62), a pressurization device (74) may be provided for pressurizing the simulated cerebrospinal fluid (72) contained within the ventricle chamber (70). The pressurization device (74) may be operatively connected, mounted, fastened or otherwise associated with the ventricle target (62) in any manner permitting the desired pressurization of the simulated cerebrospinal fluid (72).

Further, the pressurization device (74) may be comprised of any device, structure or mechanism suitable for, and capable of, providing a desired amount of pressure to the simulated cerebrospinal fluid (72). Preferably, the pressurization device (74) permits the pressure of the simulated cerebrospinal fluid (72) to be set at a predetermined pressure in order to simulate a particular medical procedure. In addition, the pressurization device (74) may permit the pressure to be selectively variable such that the predetermined pressure may be varied between uses of the training model (20), between different medical procedures to be trained and/or during the performance of a medical procedure to be trained.

Referring to FIG. 5, in one embodiment of the pressurization device (74), the pressurization device (74) is comprised of a fluid reservoir (76) in fluid communication with the ventricle chamber (70) and a pressure gauge or pressure measuring instrument (78) for monitoring the pressure of the fluid within the ventricle chamber (70). Thus, the fluid reservoir (76) contains an amount of the simulated cerebrospinal fluid (72) and the pressure measuring instrument (78) measures the pressure of the simulated cerebrospinal fluid (72) within the ventricle chamber (70).

In an exemplary embodiment, a manometer (80) is provided which comprises both the fluid reservoir (76) and the pressure measuring instrument (78). Specifically, the manometer (80) is operatively connected in fluid communication with the ventricle chamber (70) and provides a liquid column hydrostatic instrument for measuring the fluid pressure in the ventricle chamber (70). Any type or configuration of manometer (80) may be utilized. However, the manometer (80) may be comprised of a cylindrical container (82). For instance, the cylindrical container (82) may be a clear plastic container having a height or length of approximately 25 centimeters and having a diameter of approximately 8 centimeters. The container (82) is preferably marked along its height or length to provide a graduated measurement of the fluid level within the container (82).

As well, the manometer (80) is in fluid communication with the ventricle target (62). In this regard, any type of connector or connection mechanism may be used which permits fluid communication between the container (82) and the ventricle chamber (70). For instance, the manometer (80) may be further comprised of a length of flexible tubing (84) extending between, and communicating with, an opening in the bottom of the container (82) and an opening in the ventricle chamber (70). In one embodiment, the flexible tubing (84) is comprised of a polyvinylchloride tubing having a diameter of approximately 1 centimeter and having a sufficient length to extend between the container (82) and the ventricle chamber (70).

In instances in which the training model (20) includes the base component (24), as shown in FIG. 5, the base component (24) preferably defines a channel or canal (86) therethrough to permit the passage of the tubing (84) through the base component (24) for connection with the ventricle target (62). In this embodiment, the ventricle target (62) preferably comprises a part or portion of the training component (26) such that the ventricle target (62) is wholly contained or housed within the training component (26) when the training model (20) is assembled. In this instance, an end of the tubing (84) will be extended from the base component (24) within the training component receptacle (28) for connection with the ventricle chamber (70). Compatible connectors or fasteners may be provided on each of the end of the tubing (84) and the ventricle chamber (70) to permit the components to be readily connected and disconnected.

Alternately, at least a part or portion of the ventricle target (82) may be contained or housed within the base component (24). For instance, when required, the training component receptacle (28) may define a cavity (not shown) or indentation permitting the receipt of at least a portion of the ventricle target (62) therein when the training component (26) is mounted in the base component (24) for assembly of the training model (20). In this instance, the end of the tubing (84) extends from the base component (24), within the cavity or indentation defined by the training component receptacle (28), for connection with the ventricle chamber (70). Once again, compatible connectors or fasteners may be provided on each of the end of the tubing (84) and the ventricle chamber (70) to permit the components to be readily connected and disconnected.

In use, the manometer (80), the tubing (84) and the ventricle chamber (70) are connected to permit the communication of simulated cerebrospinal fluid (72) therebetween. Variation of the placement of the manometer (80), and particularly the placement of the level of the simulated cerebrospinal fluid (72) contained therein, relative to the ventricle target (62) will vary the pressure of the simulated cerebrospinal fluid (72) within the ventricle chamber (70). Variations in pressure will be reflected on the graduated scale of the cylindrical container (82). For instance, placement of the manometer (80) such that the fluid level in the container (82) is above the ventricle target (62) will tend to increase the pressure of the simulated cerebrospinal fluid (72) in the ventricle chamber (70).

As well, in some embodiments, the training model (20) may be provided with a simulated skin. Specifically, a skin layer (88) may be provided for overlying at least the outermost surface (42) of the skull section (22). In other words, the skin layer (88) overlies the outer skull layer (36) such that the outer skull layer (36) is interposed between the skin layer (88) and the middle skull layer (38). In addition to overlying the skull section (22), which comprises the outer surface of the training component (26) in some embodiments, a skin layer (88) may also be provided for overlying all or a portion of the outer surface of the base component (24). Thus, for instance, the complete simulated head (30) may include the skin layer (88) in order to provide a more realistic simulation of the medical procedure.

The skin layer (88) is constructed of a skin layer material (90) which simulates skin tissue when penetrated. Thus, the skin layer material (90) mimics or imitates skin tissue when penetrated, pierced or passed into or through.

In the exemplary embodiments described herein, prior to penetrating the skull, the medical procedure may further require the penetration of the skin in order to provide access to the skull for the subsequent procedure. In this instance, the skin is typically cut or incised. Thus, in such embodiments, the skin layer material (90) particularly simulates, mimics or imitates the "feel" and resistance of skin tissue being penetrated by cutting or incising.

The skin layer material (90) may be comprised of any material or substance capable of simulating skin tissue as described. For instance, in some embodiments, the skin layer material (90) is comprised of a silicone rubber or a flexible silicone elastomer. Further, the skin layer material (90) preferably provides a Shore A (Durometer) scale hardness of about 10 following curing, which imitates the typical hardness of skin tissue when penetrated. In a preferred embodiment, the skin layer material (90) is comprised of a platinum cure silicone rubber, which may be tinted with flesh colored dye or pigment, and which is commercially available under the name Dragon Skin™. Dragon Skin™ is a trade-mark of Smooth-On Inc. (Pennsylvania, U.S.A.)

In addition, the skin layer (88) preferably has a thickness which approximates that of the skin of the human head. In some embodiments, the skin layer (88) has a thickness which particularly approximates that of the skin covering the portion or area of the neurocranium typically penetrated in performance of the medical procedure to be trained. In a preferred embodiment, the skin layer (88) has a thickness of about 2 millimeters.

As well, one or more alarms or sensors (not shown) may be associated with one or more of the components of the training model (20), such as the skin layer (88), the skull section (22), the dural layer (52), the brain layer (56) and/or the target (60). Each sensor may monitor one or more of these components and provide a visual, auditory, tactile or other alarm, signal or feedback upon the occurrence of a particular event, in order to enhance the simulation.

In an exemplary embodiment of the training model (20) including the base component (24) and the training component (26), the training model (20) may be prepared, manufactured and assembled as described below. Alternately, the training component (26) alone may be prepared, manufactured and assembled to be provided as the training model (20). In this instance, the training component (26) is preferably mounted or fastened to a supporting structure, as discussed previously.

Figure 6:
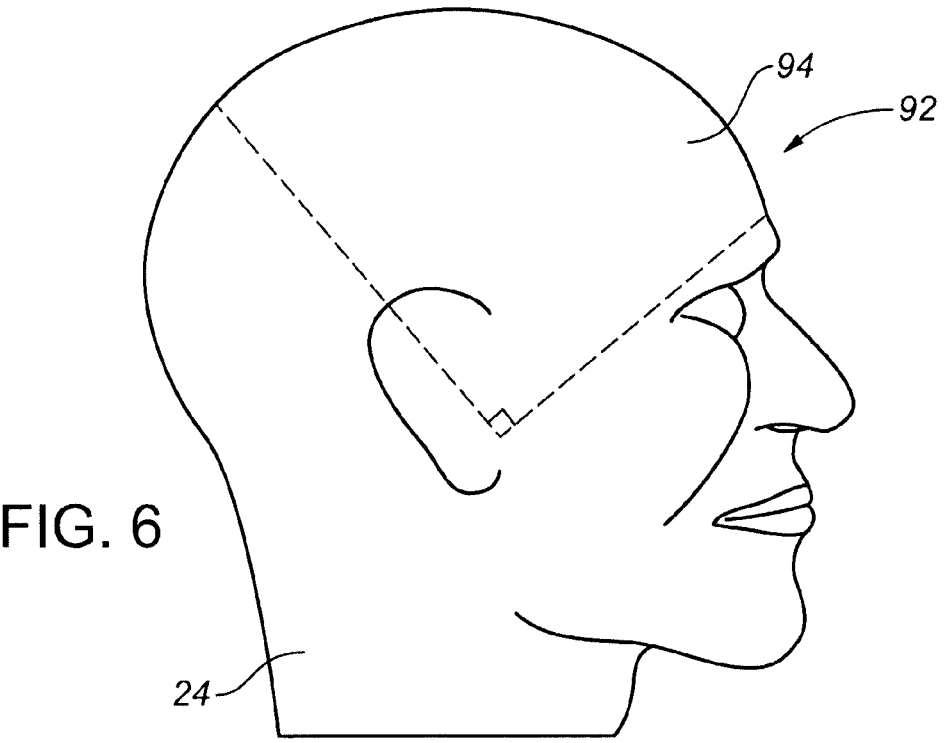
FIG. 6 is a side view of a cast of a human head and neck utilized in the manufacture of the training model of FIG. 1.
Figure 7:
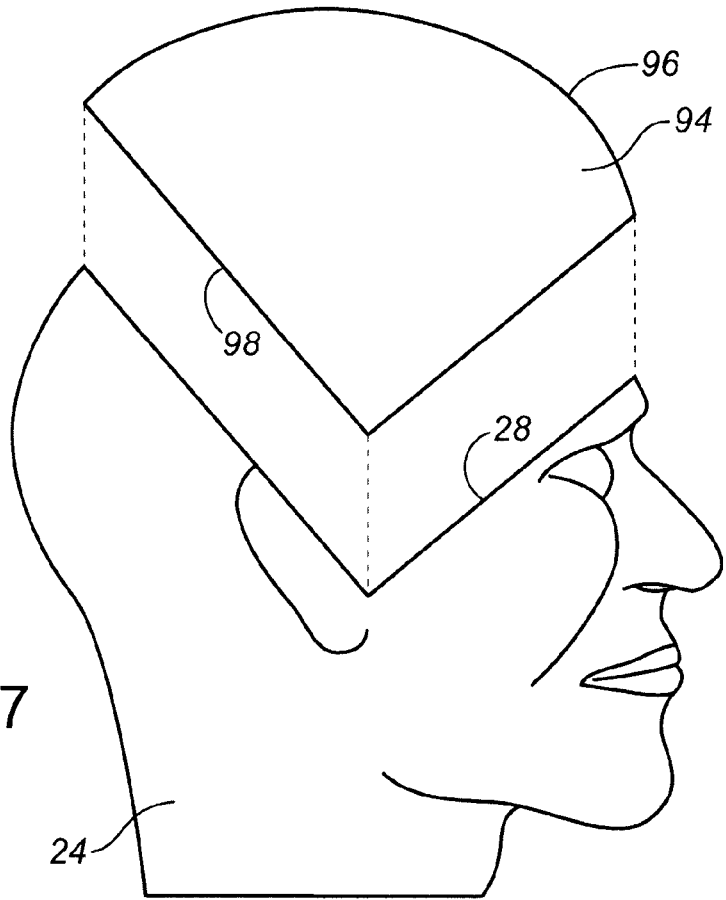
FIG. 7 is a side view of the cast of FIG. 6 showing the removal of a skull cap portion of the cast.

In the preparation of the exemplary embodiment of the training model (20), a mould is first provided of a human head and neck. Referring to FIG. 6, the mould is utilized to create or prepare a solid cast (92) of the head and neck using a urethane resin, such as Smooth Cast™ 310. Following curing of the cast (92), as shown in FIGS. 6 and 7, a cut is made in the cast (92) from the top of the orbital rim of the head to the bottom of the external auditory meatus or ear. The cut is then continued at 90 degrees to the top of the head in order to provide a cut-away portion from the cast (92), referred to as the skull cap portion (94). The skull cap portion (94) has a superior or upper surface (96), defined by the outer surface of the cast (92). The skull cap portion (94) also has an opposed inferior or lower surface (98), defined by the cut portion of the cast (92).

Figure 8:
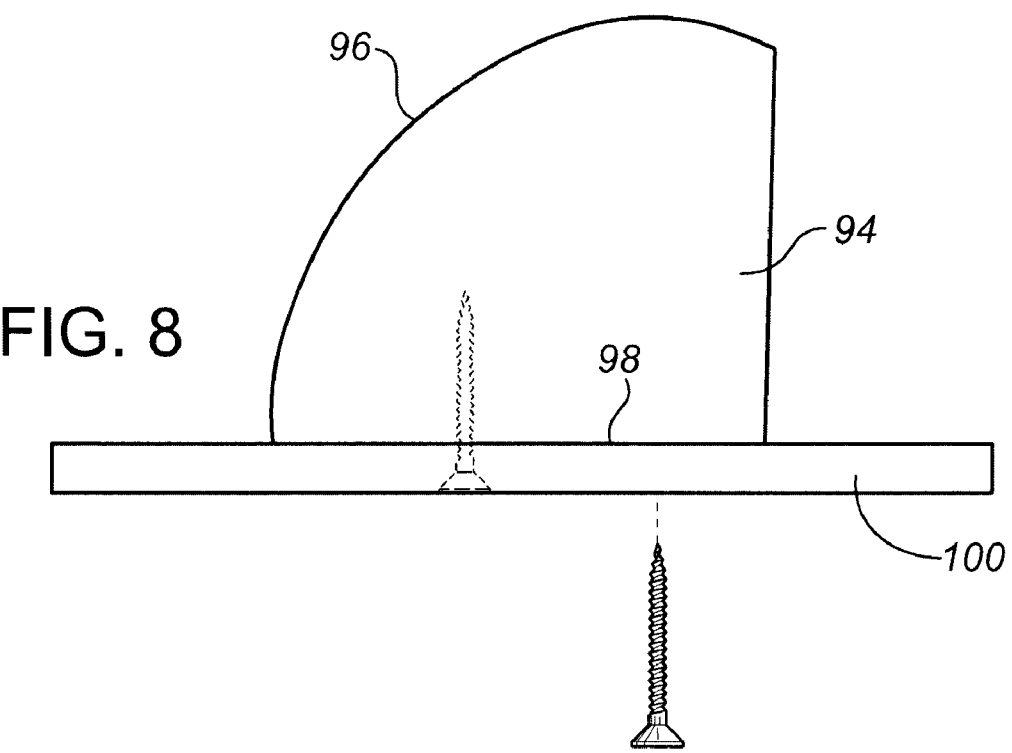
FIG. 8 is a side view of the skull cap portion of FIG. 7, showing the mounting of the skull cap portion with a mounting board in the manufacture of the training model of FIG. 1.
Figure 9:
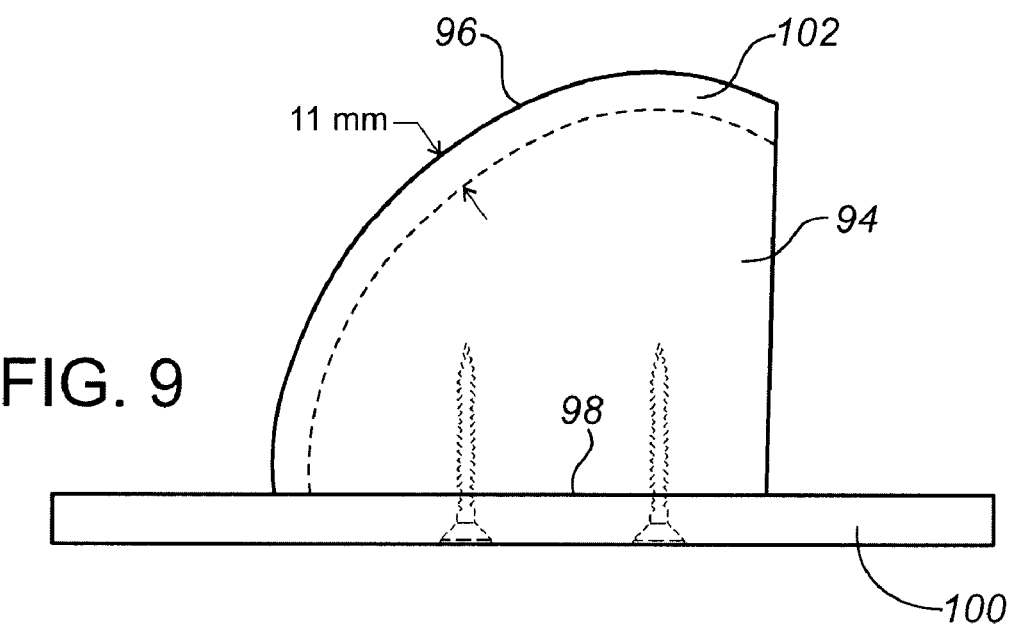
FIG. 9 is a side view of the skull cap portion of FIG. 8, showing the shaving of a superior surface of the skull cap portion in the manufacture of the training model of FIG. 1.

The skull cap portion (94) is then removed from the cast (92), as shown in FIG. 7. Once the skull cap portion (94) is removed, the balance or remainder of the cast (92) comprises the base component (24) of the training model (20) defining the training component receptacle (28). Specifically, the training component receptacle (28) is defined by the space or area in the cast (92) previously occupied by the skull cap portion (94). Referring to FIGS. 8 and 9, the skull cap portion (94) is then fastened to or mounted with a surface or mounting board (100), such as by screwing the skull cap portion (94) to a plywood mounting board. Preferably, the skull cap portion (94) is mounted such that at least a portion of the inferior surface (98) of the skull cap portion (94) is in contact with the mounting board (100).

Referring to FIG. 9, an outermost portion or layer (102) of the superior surface (96) of the skull cap portion (94) is then shaved away or otherwise removed. Preferably, an outermost portion or layer (102) having a thickness of about 11 millimeters is removed from the superior surface (96).

Figure 10:
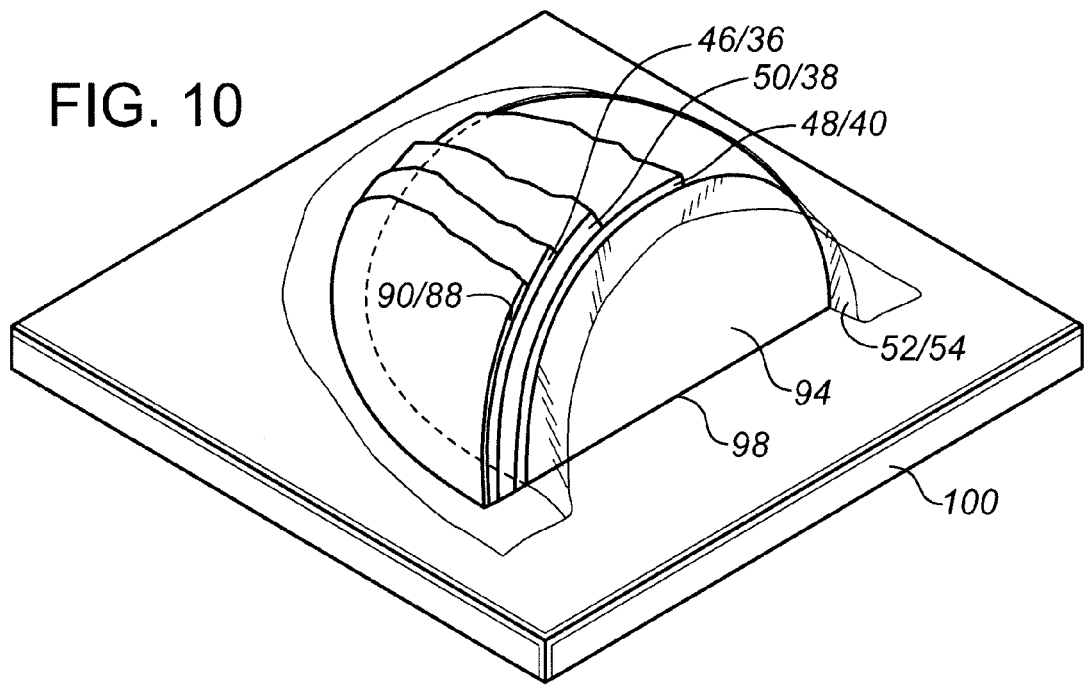
FIG. 10 is a perspective view of the skull cap portion of FIG. 9, showing the application of various layers to the skull cap portion in the manufacture of the training model of FIG. 1.

Referring to FIG. 10, the superior surface (96) of the skull cap portion (94) is subsequently covered with a plastic film, such as Saran Wrap™. The plastic film or Saran Wrap™ simulates the dural layer (52) comprising the training component (26).

Referring further to FIG. 10, the plastic film is then covered with a layer of the quick drying cement, such as LePage™ Poly Super Strength Cement-Concrete patch material, having a thickness of about 2-3 millimeters. This first layer of cement simulates the inner skull layer (40) of the skull section (22) of the training component (26). After this first layer of cement sets, it is covered with a layer of a urethane foam having a thickness of about 3-4 millimeters. This layer of urethane foam simulates the middle skull layer (38) of the skull section (22) of the training component (26). Once the urethane foam is cured, the urethane foam is covered with a second layer of the quick drying cement, such as LePage™ Poly Super Strength Cement-Concrete patch material, also having a thickness of about 2-3 millimeters. This second layer of cement simulates the outer skull layer (36) of the skull section (22) of the training component (26).

As also shown in FIG. 10, following the setting of the second layer of cement, the second layer of cement is covered with a layer of silicone rubber, such as Dragon Skin™, having a thickness of about 2 millimeters. This layer of silicone rubber simulates the skin layer (88) of the training component (26). Once the silicone rubber has cured, the skull cap portion (94) may be removed from the mounting board (100) and any excess materials may be trimmed from the skull cap portion (94), particularly any excess materials extending beyond the edges of the superior surface (96) of the skull cap portion (94) of the cast (92).

Figure 11:
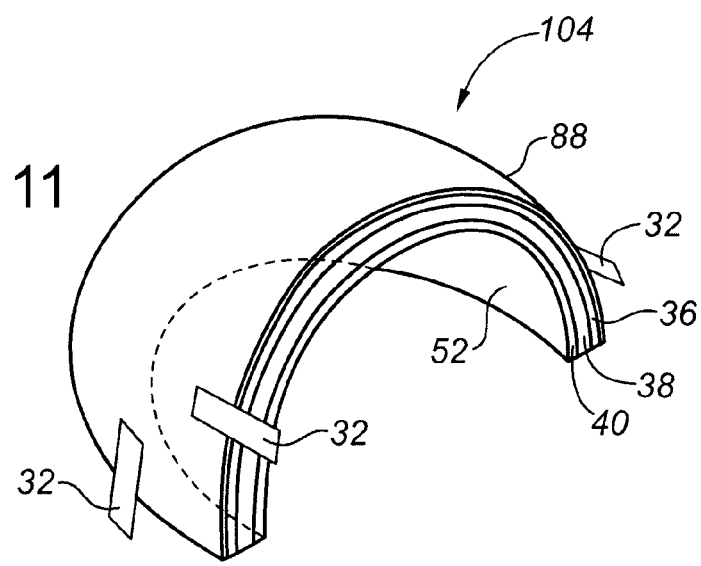
FIG. 11 is a perspective view of the various layers of FIG. 10 removed from the skull cap portion in the manufacture of the training model of FIG. 1.

Finally, as shown in FIG. 11, the layers or materials applied to the skull cap portion (94) of the cast (92) as described above, referred to collectively as the "skull cap" (104), may be removed. In this regard, the presence of the plastic film adjacent the superior surface (96) of the skull cap portion (94) facilitates the removal of the skull cap (104) from the skull cap portion (94). Once removed from the skull cap portion (94), the resulting skull cap (104) preferably has a thickness of about 7-10 millimeters. The skull cap portion (94) is set aside for later use in the preparation of replacement, substitute or alternate training components (26).

One or more complementary fasteners, such as Velcro™ strips, are attached to adjacent surfaces of the cast (92) comprising the base component (24), adjacent the training component receptacle (28) defined thereby, and the skull cap (104) comprising the training component (26). When later fastened together, the outermost surface of the skull cap (104) is preferably continuous with the outermost surface of the cast (92).

Further, the channel or canal (86) is drilled through the cast (92) comprising the base component (24) having a size sufficient to accommodate the tubing (84). For instance, where the tubing (84) has a diameter of about 1 centimeter, the channel or canal (86) preferably has a diameter of about 1.9-2.0 centimeters (about ¾ inches). Further, the channel or canal (86) is preferably drilled through the neck of the cast (92) and to the training component receptacle (28) defined thereby. Specifically, the channel or canal (86) extends to a location or position in the training component receptacle (28) to be occupied by a target (60), particularly the ventricle target (62) as shown in FIG. 5. The channel or canal (86) is preferably provided in all embodiments comprising the ventricle target (62), but may not be required in embodiments comprising the hematoma target (64) only.

Referring to FIG. 5, the ventricle target (62) is placed within the training component receptacle (28) and fastened in position adjacent the exit point of the channel or canal (86). If required to more readily accommodate the ventricle target (62), a cavity or indentation (not shown) may be hollowed or shaved out of the training component receptacle (28) having a size and configuration sufficient to accommodate at least a portion of the ventricle target (62) therein. For instance, the cavity or indentation may have a size of about 55 millimeters by 60 millimeters. The ventricle target (62) may be fastened in position using any suitable fastener or fastening mechanism (not shown). However, the ventricle target (62) is preferably removably or releasably fastened in position by one or more complementary fasteners, such as Velcro™ fastening strips, on adjacent surfaces.

The tubing (84) is extended through the channel or canal (86) formed in the base component (24) such that one end extends to the training component receptacle (28). This first end of the tubing (84) is connected with the ventricle target (62), preferably comprised of a latex balloon. The opposed, second end of the tubing (84) is connected with the cylindrical container (82) comprising the manometer (80). The ventricle target (62), the tubing (84) and the container (82) are filled with clear water comprising the simulated cerebrospinal fluid (72).

To form the remainder of the training component (26), the skull cap (104) is inverted and filled with a layer of a mixture of solid wax and liquid paraffin wax, covering as much of the interior surface of the skull cap (104) as possible. This layer of the wax mixture simulates the brain layer (56) of the training component (26), and is applied against the plastic film simulating the dural layer (52). The wax mixture is preferably applied to cover the entire plastic film. However, it is not necessary that the wax mixture fill the entire cavity defined between the skull cap (104) and the base component (24) when assembled.

Further, portions of the wax mixture may require removal to provide a space or cavity therein sufficient to accommodate one or both of the ventricle target (62) and the hematoma target (64) in its intended position or location underlying the skull cap (104). Once the necessary space is provided, the hematoma target (64), preferably comprised of a latex balloon, may be positioned underlying the skull cap (104) adjacent the innermost surface thereof. In other words, the hematoma target (64) is preferably positioned adjacent the plastic film comprising the dural layer (52). In addition, the hematoma target (64) is preferably positioned adjacent a lateral edge or side of the skull cap (104), rather than being positioned centrally of the skull cap (104). Finally, if required to maintain its position, the hematoma target (64) may be fastened or fixed in position in the skull cap (104) in any suitable manner. For instance, the hematoma target (64) may be glued to the plastic film in the desired position using an epoxy glue.

The training component (26) comprised of the skull cap (104), the wax mixture and the hematoma target (64) are then attached to the base component (24) within the training component receptacle (28) using the previously applied Velcro™ fastening strips. When assembled, the simulated head (30) is provided.

If desired, a simulated skin overlay may be applied to the simulated head (30). In particular, the skin layer (88) for the simulated head (30) may be created by pouring a silicone rubber, such as Dragon Skin™, over the assembled simulated head (30) including the training and base components (26, 24). The silicone rubber may be poured or applied by any suitable method or process, such as by using a rotational method. Once applied and cured, the portion or area of the silicone rubber covering the skull cap (104) is preferably cut away from the remainder of the silicone rubber covering the base component (24), in order to permit the removal of the training component (26) in the simulated head (30).

In the event that this process requires the removal of all or a portion of the cured silicone rubber from its underlying structure, the silicone rubber is preferably replaced or re-applied to the underlying structure by fastening or affixing it in position in any suitable manner. For instance, the silicone rubber may be re-applied and fastened to the underlying structure, such as the base component (24) or the skull cap (104) comprising the training component (26), by gluing the silicone rubber with an epoxy glue.

If desired, the simulated head (30) may be attached to a mannequin or other simulated body structure or supporting structure (34) in preparation for the performance of the medical procedure to be trained. Specifically, the simulated head (30) is preferably supported in a head down position such that the face of the simulated head (30) is directed upwardly. The exemplary simulated head (30) is now ready for use in the training of the following exemplary medical procedures.

In a first example, the medical procedure to be trained is comprised of the insertion of an external ventricular drain in order to drain or withdraw an amount of cerebrospinal fluid. Prior to commencing the medical procedure, the ventricle target (62), the tubing (84) and the cylindrical container (82) are filled with an amount of the simulated cerebrospinal fluid (72). In addition, the position of the cylindrical container (82) is adjusted to set the fluid level in the cylindrical container (82) to the height above the external auditory meatus required or desired to simulate the intracranial pressure. For example, if the simulated medical procedure stipulates a patient with impending tonsilar herniation, the fluid level should be set at about 50 to 60 centimeters above the level of the external auditory meatus. By way of a further example, an increased pressure of the simulated cerebrospinal fluid (72) will also be desired when simulating a procedure in some medical conditions, such as hydrocephalus.

Following the donning of a sterile surgical gown, mask and gloves, the person to be trained opens a sterile twist drill set and creates a sterile working field. Within the sterile field, a ventriclostomy kit is opened. The model and type of ventriclostomy kit may vary depending on institutional practices. The skin layer (88), at the position or location in the training component (26) at which the drain is to be inserted in the simulated head (30), is then cleaned. The remainder of the simulated head (30) or training model (20) is preferably covered in sterile drapes.

A small incision is first made in the skin layer (88) and the skin layer (88) is bluntly dissected down to the outermost surface (42) of the skull section (22). A drill bit is then attached to a twist drill and a hole is slowly drilled through the outer skull layer (36). Once through the outer skull layer (36), the drill will give a few millimetres as it proceeds through the middle skull layer (38). Drilling is subsequently continued as the drill bit advances through the inner skull layer (40). Once the drill bit begins to encounter more resistance, the drill is removed as the drill bit should be through the inner skull layer (40).

A dura knife is then used to incise the dural layer (52). A drain or catheter is mounted on a trocar and the trocar is extended through the hole in the skull section (22) and the incised dural layer (52) and subsequently advanced through the brain layer (56) until the trocar encounters resistance. Resistance to advancement of the trocar is provided by the contact of the trocar with the ventricle target (62). The trocar is then "popped" or moved through the ventricle chamber (70) and the proximal end of the drain is advanced within the ventricle target (62). The trocar may then be removed.

The drain is clamped with two fingers and an incision is made in the skin layer (88) a few centimeters from the location of the drain or the drain site. Using a Kelly clamp, the second incision in the skin layer (88) is tunnelled through to the drain site and the distal end of the drain is pulled through. Both incisions are subsequently sutured and the drain is attached to a drainage bag.

In a second example, the medical procedure to be trained is comprised of the evacuation of a subdural hematoma. As in the first example, following the donning of a sterile surgical gown, mask and gloves, the person to be trained opens a sterile twist drill set and creates a sterile working field. Within the sterile field, a sterile suction kit and bulb drain are opened. The skin layer (88) overlying the position or location of the hematoma target (64) in the training component (26) is then cleaned. The remainder of the simulated head (30) or training model (20) is preferably covered in sterile drapes.

A small incision is first made in the skin layer (88) and the skin layer (88) is bluntly dissected down to the outermost surface (42) of the skull section (22). A drill bit is then attached to a twist drill and a hole is slowly drilled through the outer skull layer (36). Once through the outer skull layer (36), the drill will give a few millimeters as it proceeds through the middle skull layer (38). Drilling is subsequently continued as the drill bit advances through the inner skull layer (40). Once the drill bit begins to encounter more resistance, the drill is removed as the drill bit should be through the inner skull layer (40).

A dura knife is then used to incise the dural layer (52) to access the hematoma target, and particularly the hematoma chamber (66). The simulated blood (68) is then suctioned out of the hematoma chamber (66). Subsequently, the proximal end of a drain or catheter is inserted into the hematoma chamber (66).

The drain is clamped with two fingers and an incision is made in the skin layer (88) a few centimeters from the location of the drain or the drain site. Using a Kelly clamp, the second incision in the skin layer (88) is tunnelled through to the drain site and the distal end of the drain is pulled through. Both incisions are subsequently sutured and the drain is attached to a suction bulb.

Finally, in this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A training model for use in training to perform a medical procedure which is invasive of a skull, the training model comprising a skull section, the skull section comprising:
   (a) an outer skull layer constructed of an outer skull material which simulates osseous tissue when penetrated;
   (b) a middle skull layer constructed of a middle skull material which simulates marrow tissue when penetrated; and
   (c) an inner skull layer constructed of an inner skull material which simulates osseous tissue when penetrated.

2. The training model as claimed in claim 1, further comprising a brain layer underlying the inner skull layer such that the inner skull layer is interposed between the middle skull layer and the brain layer, wherein the brain layer is constructed of a brain layer material which simulates brain tissue when penetrated.

3. The training model as claimed in claim 1, further comprising a dural layer underlying the inner skull layer such that the inner skull layer is interposed between the middle skull layer and the dural layer, wherein the dural layer is constructed of a dural layer material which simulates dural tissue when penetrated.

4. The training model as claimed in claim 2, further comprising a dural layer underlying the inner skull layer such that the dural layer is interposed between the inner skull layer and the brain layer, wherein the dural layer is constructed of a dural layer material which simulates dural tissue when penetrated.

5. The training model as claimed in claim 1, further comprising a target underlying the inner skull layer such that the inner skull layer is interposed between the middle skull layer and the target.

6. The training model as claimed in claim 5, further comprising a brain layer underlying the inner skull layer such that the brain layer is interposed between the inner skull layer and the target, wherein the brain layer is constructed of a brain layer material which simulates brain tissue when penetrated.

7. The training model as claimed in claim 6, further comprising a dural layer underlying the inner skull layer such that the dural layer is interposed between the inner skull layer and the brain layer, wherein the dural layer is constructed of a dural layer material which simulates dural tissue when penetrated.

8. The training model as claimed in claim 5 wherein the target is a ventricle target.

9. The training model as claimed in claim 8 wherein the ventricle target is comprised of a ventricle chamber for containing a simulated cerebrospinal fluid.

10. The training model as claimed in claim 9 wherein the ventricle chamber is comprised of a balloon.

11. The training model as claimed in claim 9, further comprising a pressurization device for pressurizing the simulated cerebrospinal fluid which is contained in the ventricle chamber.

12. The training model as claimed in claim 5, further comprising a dural layer underlying the inner skull layer such that the dural layer is interposed between the inner skull layer and the target, wherein the dural layer is constructed of a dural layer material which simulates dural tissue when penetrated.

13. The training model as claimed in claim 5 wherein the target is a hematoma target.

14. The training model as claimed in claim 13 wherein the hematoma target is comprised of a hematoma chamber for containing a simulated blood.

15. The training model as claimed in claim 14 wherein the hematoma chamber is comprised of a balloon.

16. The training model as claimed in claim 1 further comprising a skin layer overlying the outer skull layer such that the outer skull layer is interposed between the skin layer and the middle skull layer, wherein the skin layer is constructed of a skin layer material which simulates skin tissue when penetrated.

17. The training model as claimed in claim 16 wherein the skin layer material is comprised of a silicone rubber.

18. The training model as claimed in claim 2 wherein the brain layer material is comprised of at least one wax.

19. The training model as claimed in claim 3 wherein the dural layer material is a plastic film.

20. The training model as claimed in claim 1 wherein the outer skull material is comprised of a Portland cement.

21. The training model as claimed in claim 1 wherein the middle skull material is comprised of a urethane foam.

22. The training model as claimed in claim 1 wherein the inner skull material is comprised of a Portland cement.

23. A training model for use in training to perform a medical procedure which is invasive of a skull, the training model comprising:
(a) a base component, the base component defining a training component receptacle; and
(b) a training component for mounting in the training component receptacle, the training component comprising a skull section, the skull section comprising:
(i) an outer skull layer constructed of an outer skull material which simulates osseous tissue when penetrated;
(ii) a middle skull layer constructed of a middle skull material which simulates marrow tissue when penetrated; and
(iii) an inner skull layer constructed of an inner skull material which simulates osseous tissue when penetrated.

24. The training model as claimed in claim 23 wherein the training component is removable from the training component receptacle so that the training component is replaceable.

25. The training model as claimed in claim 24 wherein the base component and the training component together provide a simulated head.

26. The training model as claimed in claim 23 wherein the training component is further comprised of a brain layer underlying the inner skull layer such that the inner skull layer is interposed between the middle skull layer and the brain layer, and wherein the brain layer is constructed of a brain layer material which simulates brain tissue when penetrated.

27. The training model as claimed in claim 23 wherein the training component is further comprised of a dural layer underlying the inner skull layer such that the inner skull layer is interposed between the middle skull layer and the dural layer, and wherein the dural layer is constructed of a dural layer material which simulates dural tissue when penetrated.

28. The training model as claimed in claim 26 wherein the training component is further comprised of a dural layer underlying the inner skull layer such that the dural layer is interposed between the inner skull layer and the brain layer, wherein the dural layer is constructed of a dural layer material which simulates dural tissue when penetrated.

29. The training model as claimed in claim 23 wherein the training component is further comprised of a target underlying the inner skull layer such that the inner skull layer is interposed between the middle skull layer and the target.

30. The training model as claimed in claim 29 wherein the training component is further comprised of a brain layer underlying the inner skull layer such that the brain layer is interposed between the inner skull layer and the target, and wherein the brain layer is constructed of a brain layer material which simulates brain tissue when penetrated.

31. The training model as claimed in claim 30 wherein the training component is further comprised of a dural layer underlying the inner skull layer such that the dural layer is interposed between the inner skull layer and the brain layer, wherein the dural layer is constructed of a dural layer material which simulates dural tissue when penetrated.

32. The training model as claimed in claim 31 wherein the target is a ventricle target.

33. The training model as claimed in claim 32 wherein the ventricle target is comprised of a ventricle chamber for containing a simulated cerebrospinal fluid.

34. The training model as claimed in claim 33 wherein the ventricle chamber is comprised of a balloon.

35. The training model as claimed in claim 33, further comprising a pressurization device for pressurizing the simulated cerebrospinal fluid which is contained in the ventricle chamber.

36. The training model as claimed in claim 29 wherein the training component is further comprised of a dural layer underlying the inner skull layer such that the dural layer is interposed between the inner skull layer and the target, wherein the dural layer is constructed of a dural layer material which simulates dural tissue when penetrated.

37. The training model as claimed in claim 36 wherein the target is a hematoma target.

38. The training model as claimed in claim 37 wherein the hematoma target is comprised of a hematoma chamber for containing a simulated blood.

39. The training model as claimed in claim 38 wherein the hematoma chamber is comprised of a balloon.

40. The training model as claimed in claim 28 wherein the training component is further comprised of a skin layer overlying the outer skull layer such that the outer skull layer is interposed between the skin layer and the middle skull layer, and wherein the skin layer is constructed of a skin layer material which simulates skin tissue when penetrated.

41. The training model as claimed in claim 40 wherein the skin layer material is comprised of a silicone rubber.

42. The training model as claimed in claim 30 wherein the brain layer material is comprised of at least one wax.

43. The training model as claimed in claim 36 wherein the dural layer material is a plastic film.

44. The training model as claimed in claim 23 wherein the outer skull material is comprised of a Portland cement.

45. The training model as claimed in claim 44 wherein the middle skull material is comprised of a urethane foam.

46. The training model as claimed in claim 45 wherein the inner skull material is comprised of a Portland cement.

* * * * *